United States Patent

Sakai et al.

[11] Patent Number: 5,761,666
[45] Date of Patent: Jun. 2, 1998

[54] DOCUMENT RETRIEVAL SYSTEM

[75] Inventors: Tetsuya Sakai, Tokyo; Seiji Miike; Kazuo Sumita, both of Yokohama, all of Japan

[73] Assignee: Kabushiki Kaisha Toshiba, Kawasaki, Japan

[21] Appl. No.: 610,631

[22] Filed: Mar. 4, 1996

[30] Foreign Application Priority Data

Mar. 16, 1995 [JP] Japan .................................. 7-083458

[51] Int. Cl.⁶ .................................................. G06F 17/30
[52] U.S. Cl. .................................. 707/100; 707/1; 707/3; 707/5
[58] Field of Search ........................... 395/605, 601, 395/759; 707/1, 3, 5, 100

[56] References Cited

U.S. PATENT DOCUMENTS

| | | | |
|---|---|---|---|
| 4,290,115 | 9/1981 | Pitt et al. | 395/605 |
| 4,382,277 | 5/1983 | Glaser et al. | 395/605 |
| 5,123,103 | 6/1992 | OhTaki et al. | 395/605 |

*Primary Examiner*—Paul R. Lintz
*Attorney, Agent, or Firm*—Oblon, Spivak, McClelland, Maier & Neustadt, P.C.

[57] ABSTRACT

A document retrieval system is provided with an original sentence processing unit which sets a plurality of sentence types for identifying the contents of sentences, such as "OPINION" and "PROPOSAL," prepares sentence-unit excerpt sentence data classified according to the sentence types from an original sentence database storing original sentence data constituting documents, and stores the excerpt sentence data as excerpt sentence database. The original sentence processing unit comprises a type determination section for extracting excerpt sentence data corresponding to a designated sentence type, and a shaping section for shaping the excerpt sentence data in a predetermined format, e.g., in such a format that a conjunctive is deleted.

15 Claims, 29 Drawing Sheets

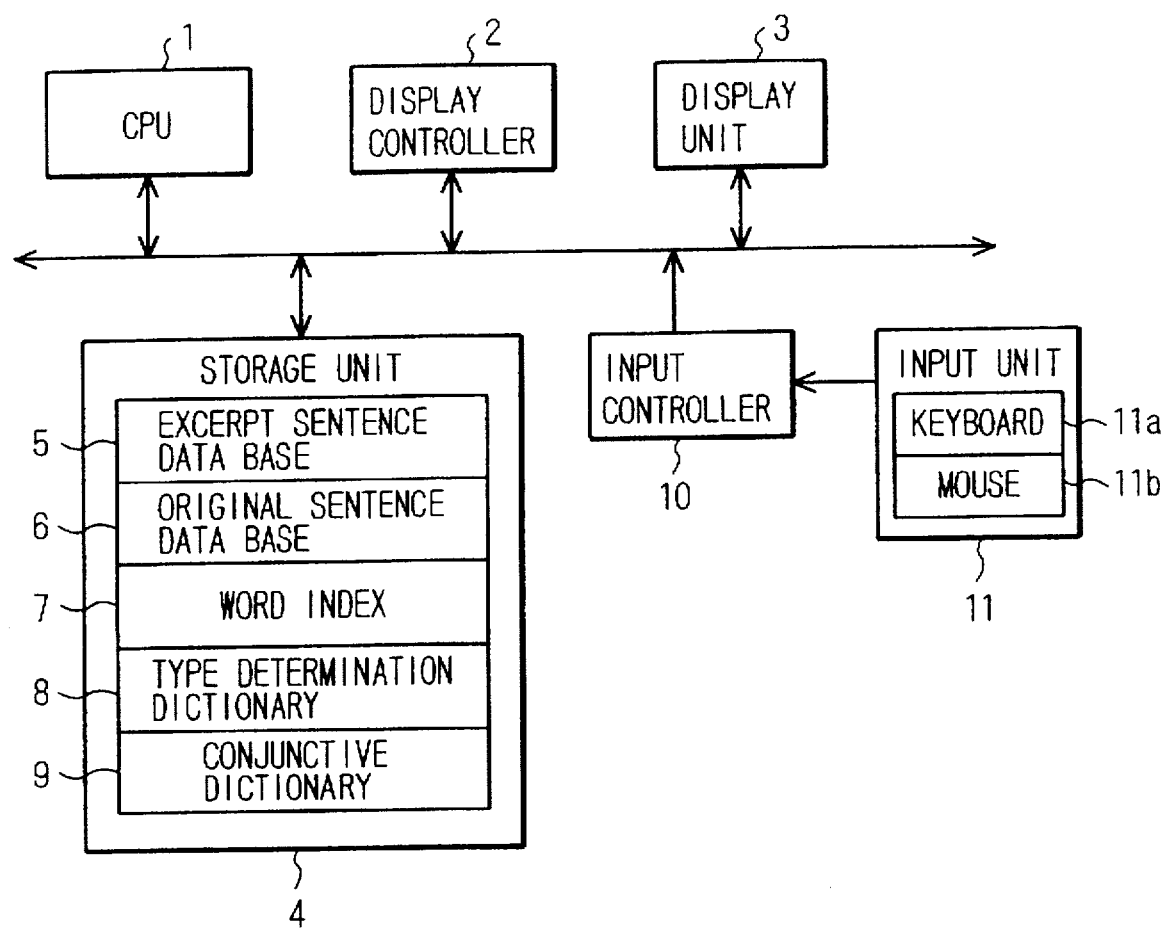
F I G. 1

| ⟨TYPE⟩ | ⟨PATTERN⟩ |
|---|---|
| OPINION/PROPOSAL | "It is considered that···"<br>"Should it not be that···"<br>"It is proposed that···"<br>"I think that···"<br>⋮ |
| POSING OF PROBLEM | "There is a problem···"<br>"Consideration will now be given of···"<br>⋮ |
| EXPECTATION/GUESS | "Maybe···"<br>"···will be···"<br>"···maybe···"<br>"I think that···"<br>⋮ |
| ⋮ | ⋮ |

FIG. 6A

ORIGINAL SENTENCE

- SENTENCE1: a
- SENTENCE2: But b
- SENTENCE3: However c
- SENTENCE4: d
- SENTENCE5: e
- SENTENCE6: Well, f
- SENTENCE7: For g
- SENTENCE8: h

EXCERPT SENTENCE

- b
- e
- h
- i

TYPE OF EXCERPT SENTENCE
- ☑ OPINION/PROPOSAL
- ☐ POSING OF PROBLEM
- ☐ EXPECTATION/GUESS
- ☐ PAST/BACKGROUND
- ☐ STATUS QUO
- ☐ CONCLUSION

FIG. 6B

ORIGINAL SENTENCE

- SENTENCE1: a
- SENTENCE2: But b
- SENTENCE3: However c
- SENTENCE4: d
- SENTENCE5: e
- SENTENCE6: Well, f
- SENTENCE7: For g
- SENTENCE8: h

EXCERPT SENTENCE

- d
- e
- i

TYPE OF EXCERPT SENTENCE
- ☐ OPINION/PROPOSAL
- ☐ POSING OF PROBLEM
- ☑ EXPECTATION/GUESS
- ☐ PAST/BACKGROUND
- ☐ STATUS QUO
- ☐ CONCLUSION

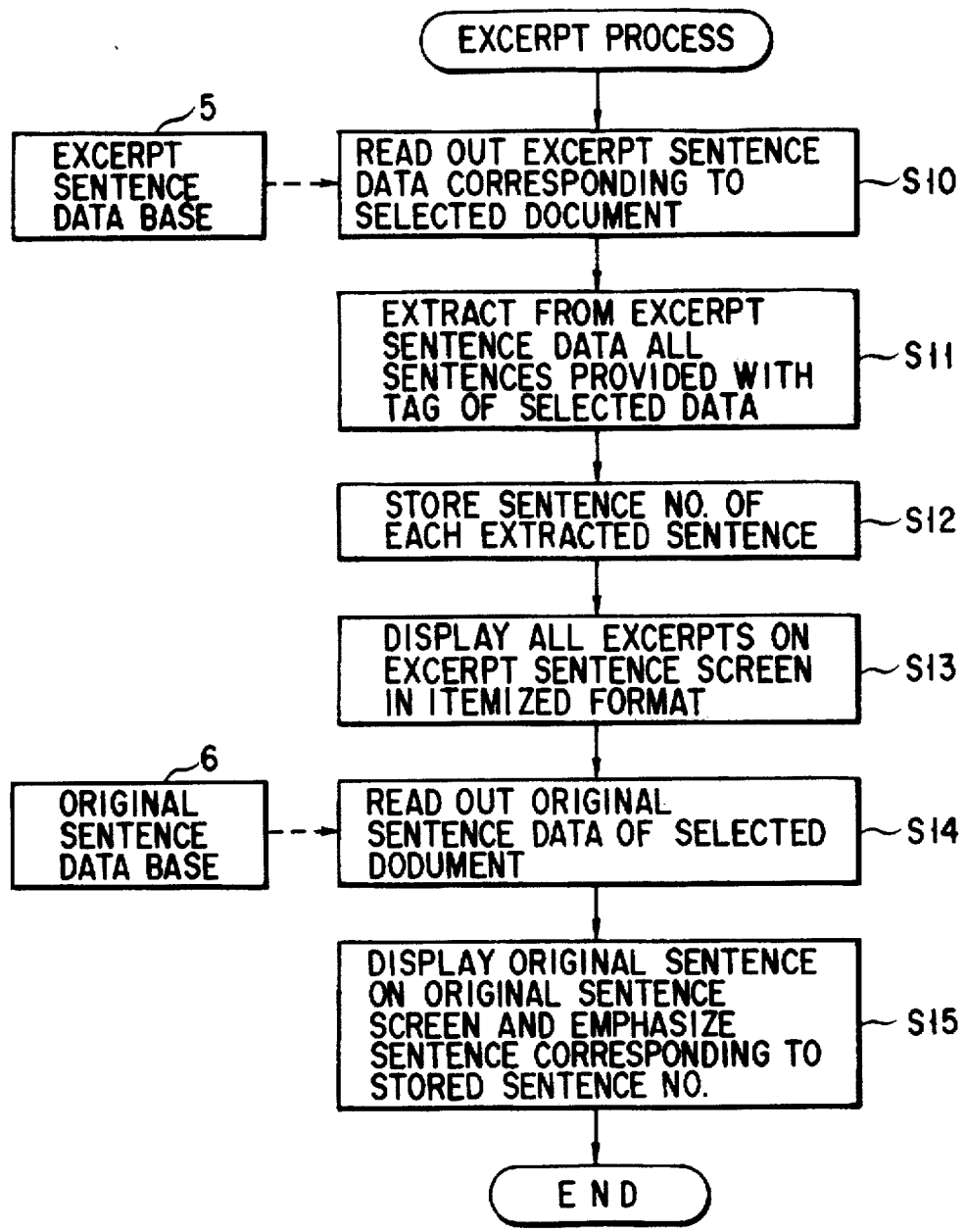
F I G. 7

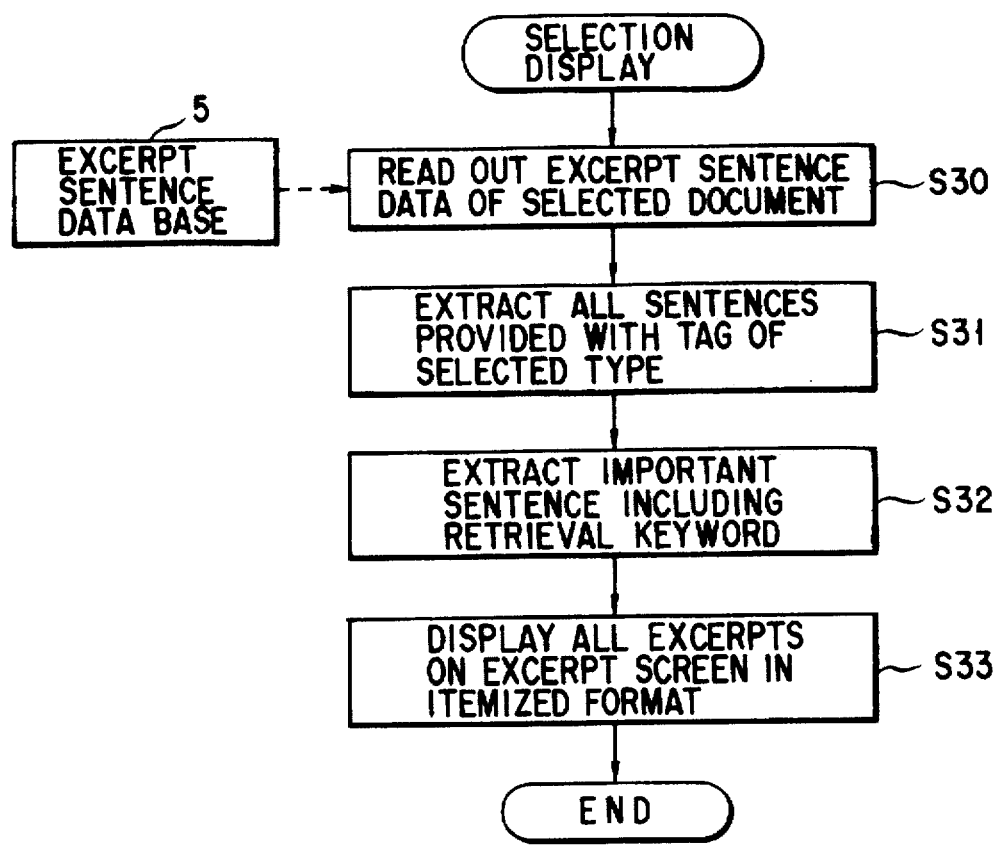
F I G. 9

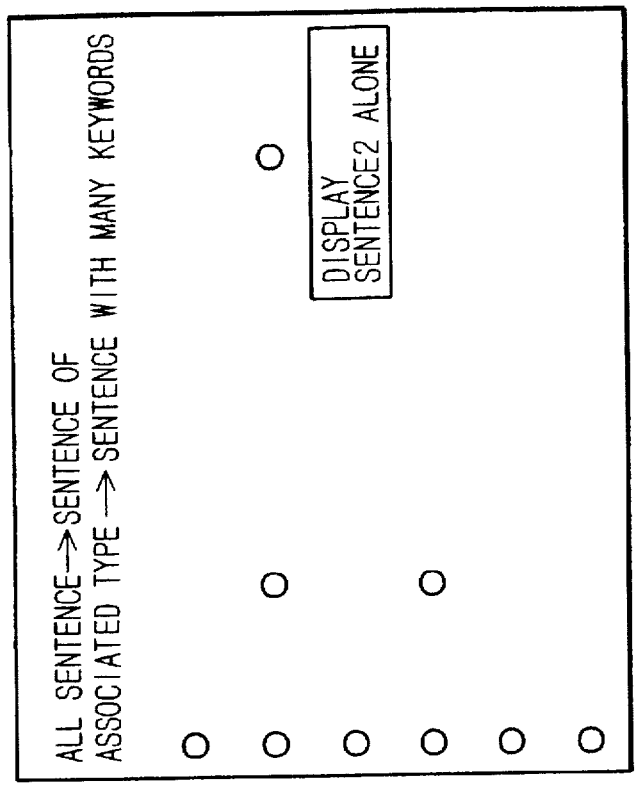
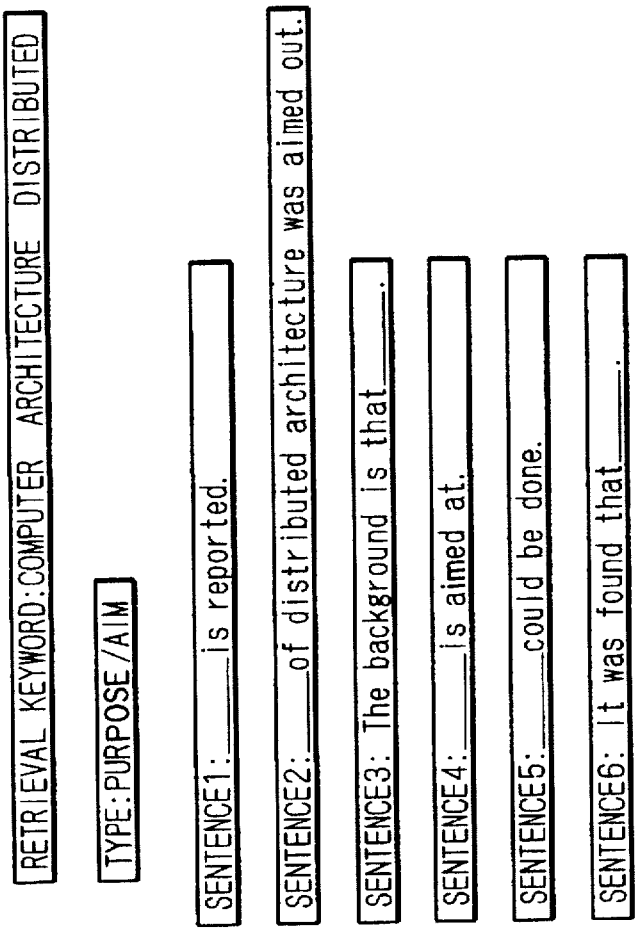
FIG. 10

TYPE DETERMINATION DICTIONARY

| ⟨TYPE⟩ | ⟨PRIORITY ORDER⟩ | ⟨PATTERN⟩ |
|---|---|---|
| OPINION/PROPOSAL | 1 | "It is considered that···" |
|  | 2 | "Should it not be that···" |
|  | 3 | "It is proposed that···" |
|  | 4 | "I think that···" |
|  | ⋮ |  |

F I G. 14A

NUMBER OF SENTECES MATCHING WITH PATTERN IN DOCUMENT

| "It is considered that···" | 2 |
| "Should it not be that···" | 1 |
| "It is proposed that···" | 3 |
| "I think that···" | 2 |

F I G. 14B

EXCERPT SENTENCE SCREEN

NUMBER OF SENTENCES SHIFTED:WITHIN 5(3)

·The intention of △△△ is considered to be ____.

·Rather, ____ should resign.

·As for ○○○, it is considerd that ____.

F I G. 14C

UPDATING OF TYPE
DETERMINATION DICTIONARY

ORIGINAL SENTENCE SCREEN

| SENTENCE | | ○ |
| SENTENCE | | ○ |
| SENTENCE | should | ○ |

F I G. 17A

《DICTIONARY REGISTRATION SCREEN》  REGISTERED WORD: "should···"

IN WHICH TYPE OF PATTERN
WILL THE WORD BE REGISTERED?

☑ OPINION/PROPOSAL
☐ POSING OF PROBLEM
☐ EXPECTATION/GUESS
⋮

(REGISTER) (CANCEL)

F I G. 17B

| ⟨TYPE⟩ | ⟨PRIORITY ORDER⟩ | ⟨PATTERN⟩ |
|---|---|---|
| OPINION/PROPOSAL | 1 | "It is considered that···" |
| | 2 | "Should it not be that···" |
| | 3 | "It is proposed that···" |
| | 4 | "I think that···" |
| | ⋮ | ⋮ |

F I G. 19A

- The intention of △△△ is considered to be ____.
- Rather, ____ should resign.  ~190
- As for ○○○, it is considered that ____.

F I G. 19B

| ⟨TYPE⟩ | ⟨PRIORITY ORDER⟩ | ⟨PATTERN⟩ |
|---|---|---|
| OPINION/PROPOSAL | 2 | "It is considered that···" |
| | 1 | "Should it not be that···" |
| | 3 | "It is proposed that···" |
| | 4 | "I think that···" |
| | ⋮ | ⋮ |

F I G. 19C

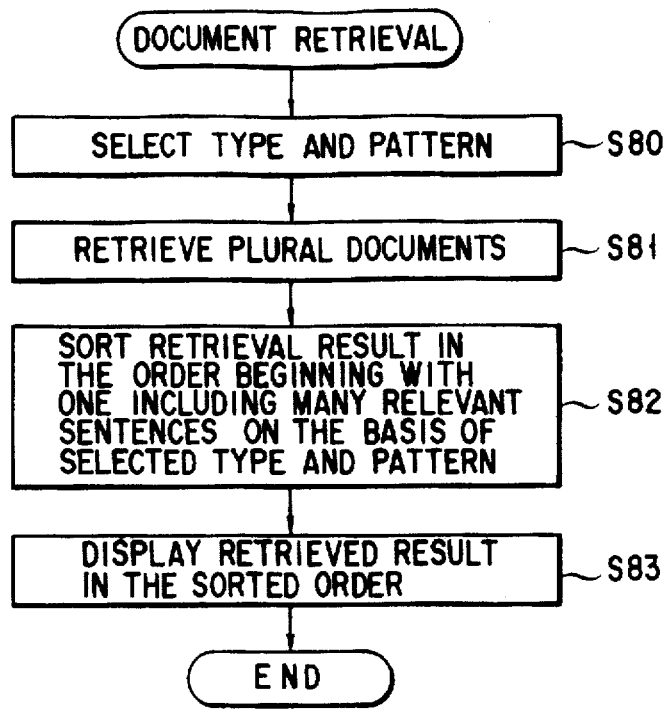
F I G. 20
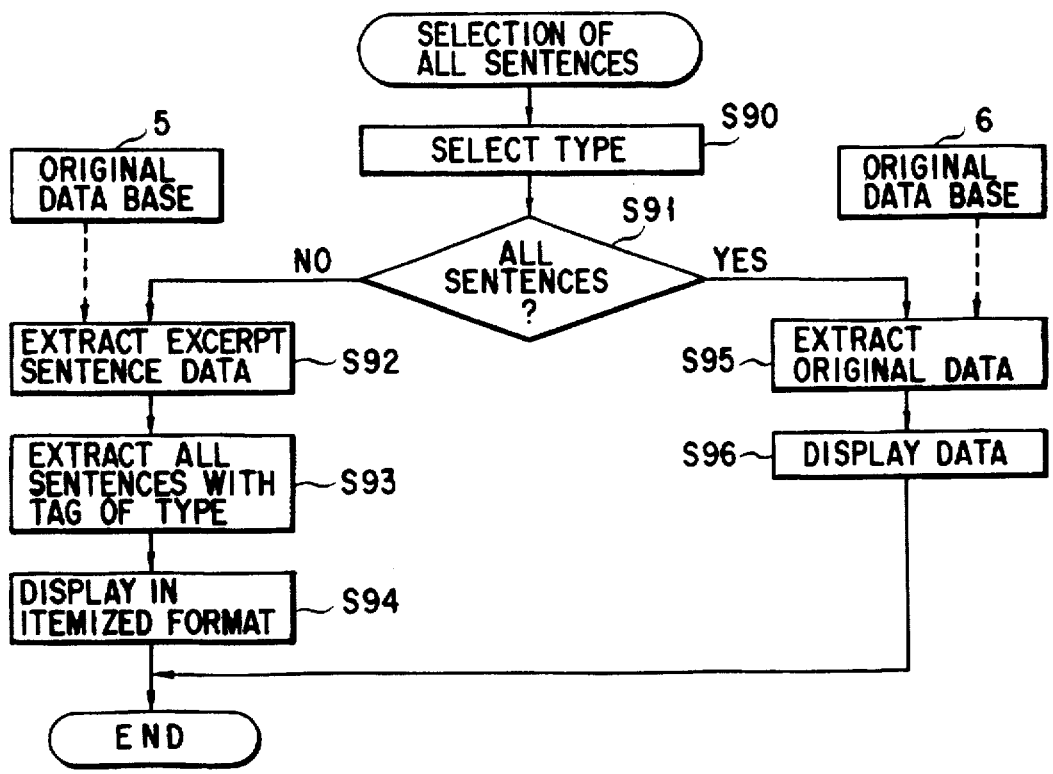
F I G. 23

FIG. 21A

EXCERPT SENTENCE DATA OF DOCUMENT A
- ⟨OPINION/PROPOSAL⟩ ~ 10
- ⟨POSING OF PROBLEM⟩ ~ 0
- ⟨EXPECTATION/GUESS⟩ ~ 4
- ...
- ⟨OPINION/PROPOSAL⟩ SENTENCE A1
- ⟨EXPECTATION/GUESS⟩ SENTENCE A2
- ⟨OPINION/PROPOSAL⟩ SENTENCE A3
- ...

EXCERPT SENTENCE DATA OF DOCUMENT B
- ⟨OPINION/PROPOSAL⟩ ~ 5
- ⟨POSING OF PROBLEM⟩ ~ 1
- ⟨EXPECTATION/GUESS⟩ ~ 8
- ...
- ⟨OPINION/PROPOSAL⟩ SENTENCE B1
- ⟨OPINION/PROPOSAL⟩ ⟨EXPECTATION/GUESS⟩ SENTENCE B2
- ⟨EXPECTATION/GUESS⟩ SENTENCE B3
- ...

EXCERPT SENTENCE DATA OF DOCUMENT C
- ⟨OPINION/PROPOSAL⟩ ~ 3
- ⟨POSING OF PROBLEM⟩ ~ 0
- ⟨EXPECTATION/GUESS⟩ ~ 5
- ...
- ⟨OPINION/PROPOSAL⟩ SENTENCE C1
- ⟨EXPECTATION/GUESS⟩ SENTENCE C2
- ⟨EXPECTATION/GUESS⟩ SENTENCE C3
- ...

FIG. 21B

⟨OPINION/PROPOSAL⟩
(1) DOCUMENT A
(2) DOCUMENT B
(3) DOCUMENT C

FIG. 21C

⟨EXPECTATION/GUESS⟩
(1) DOCUMENT B
(2) DOCUMENT C
(3) DOCUMENT A

TYPE OF EXCERPT SENTENCE

☑ OPINION/PROPOSAL
☐ POSING OF PROBLEM
☐ EXPECTATION/GUESS
☐ PAST/BACKGROUND
⋮
☐ STATUS QUO
☐ CONCLUSION
☐ ALL SENTENCES

EXCERPT SENTENCE

| ⟨TYPE⟩ | ⟨PATTERN⟩ |
|---|---|
| FACT | CONCLUSIVE AUXILIARY VERB AT END OF SENTENCE |
| EXCERPT/GUESS | ASSUMPTIVE ADVERB AT TOP OF SENTENCE<br>ASSUMPTIVE AUXILIARY VERB AT END OF SENTENCE |
| ⋮ | ⋮ |

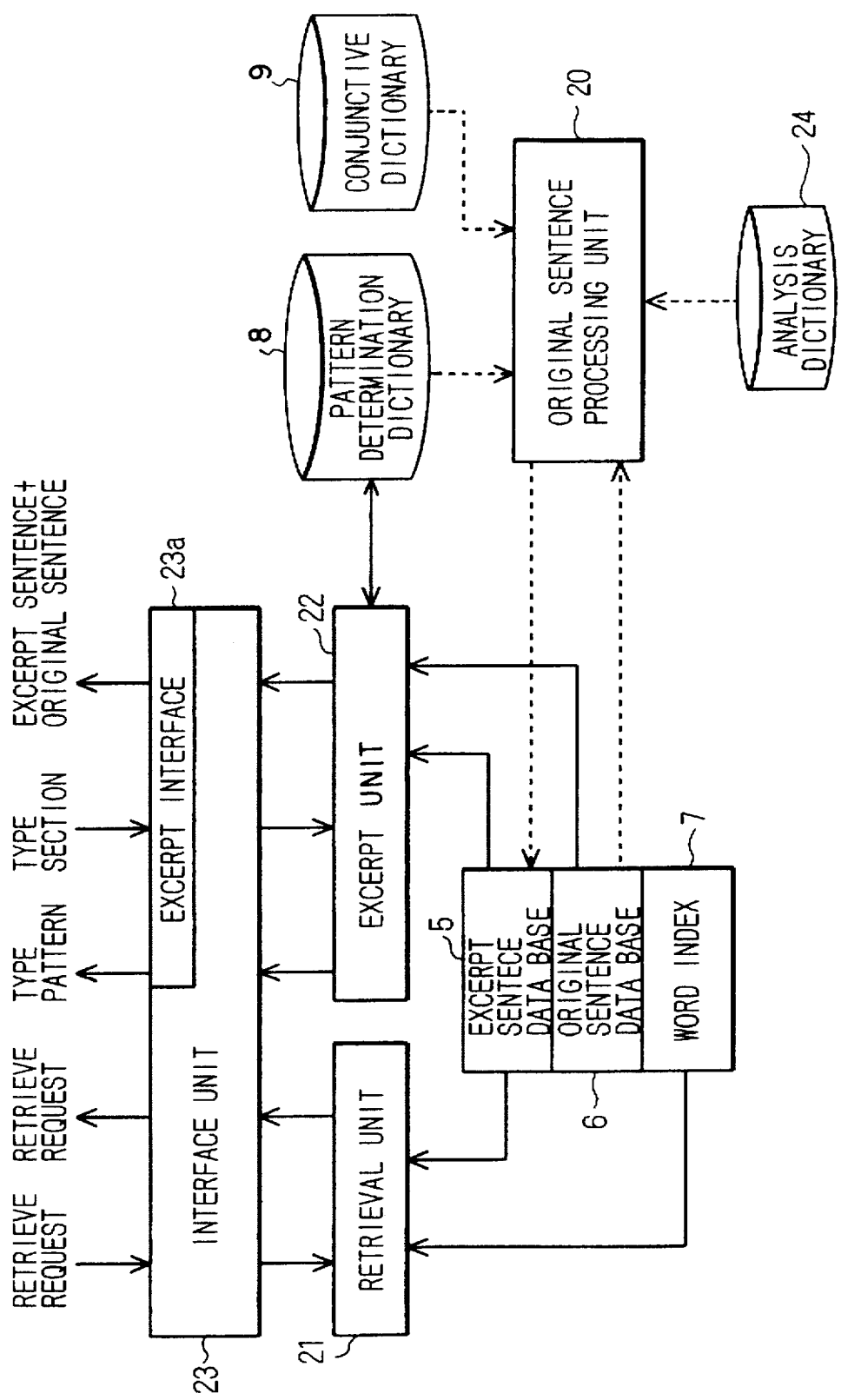
F I G. 25

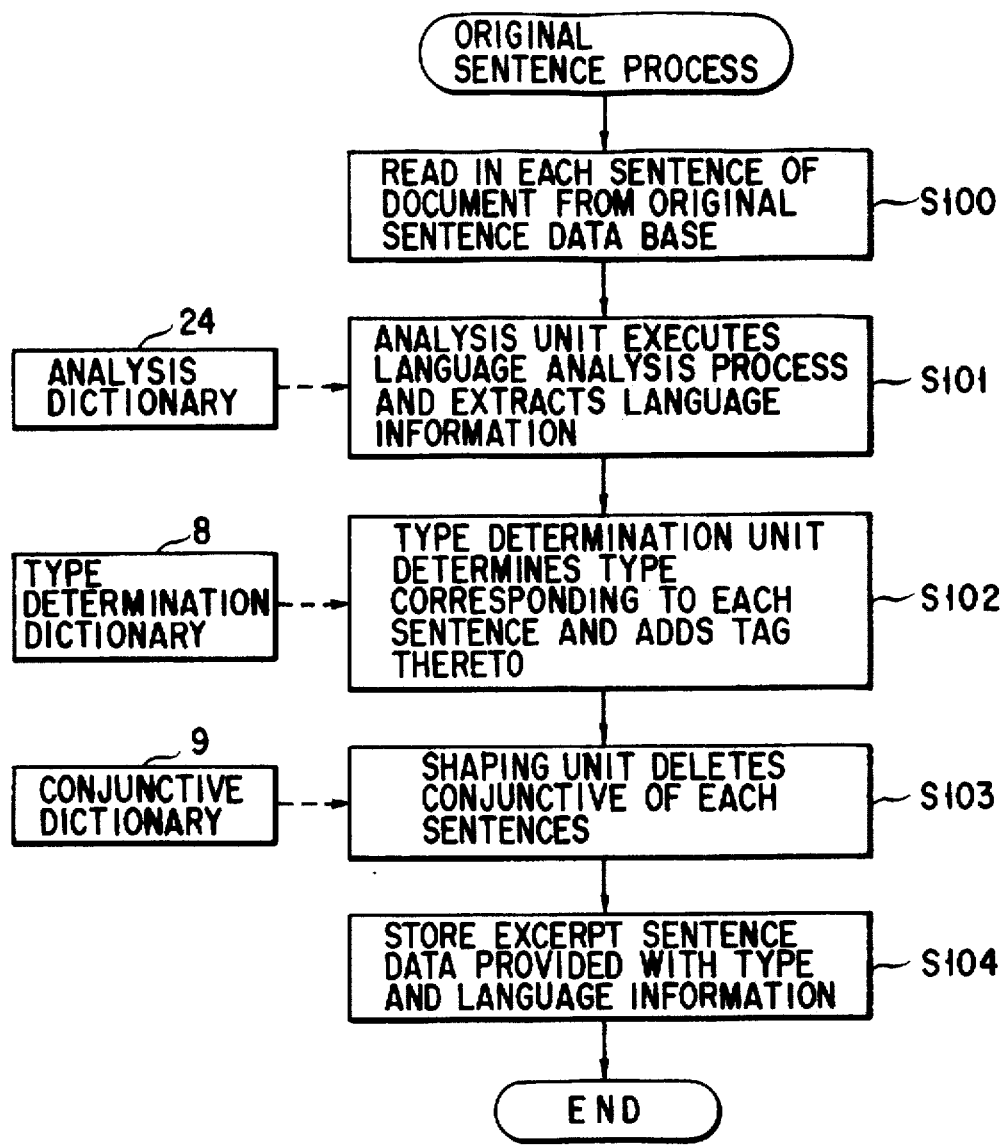
F I G. 26

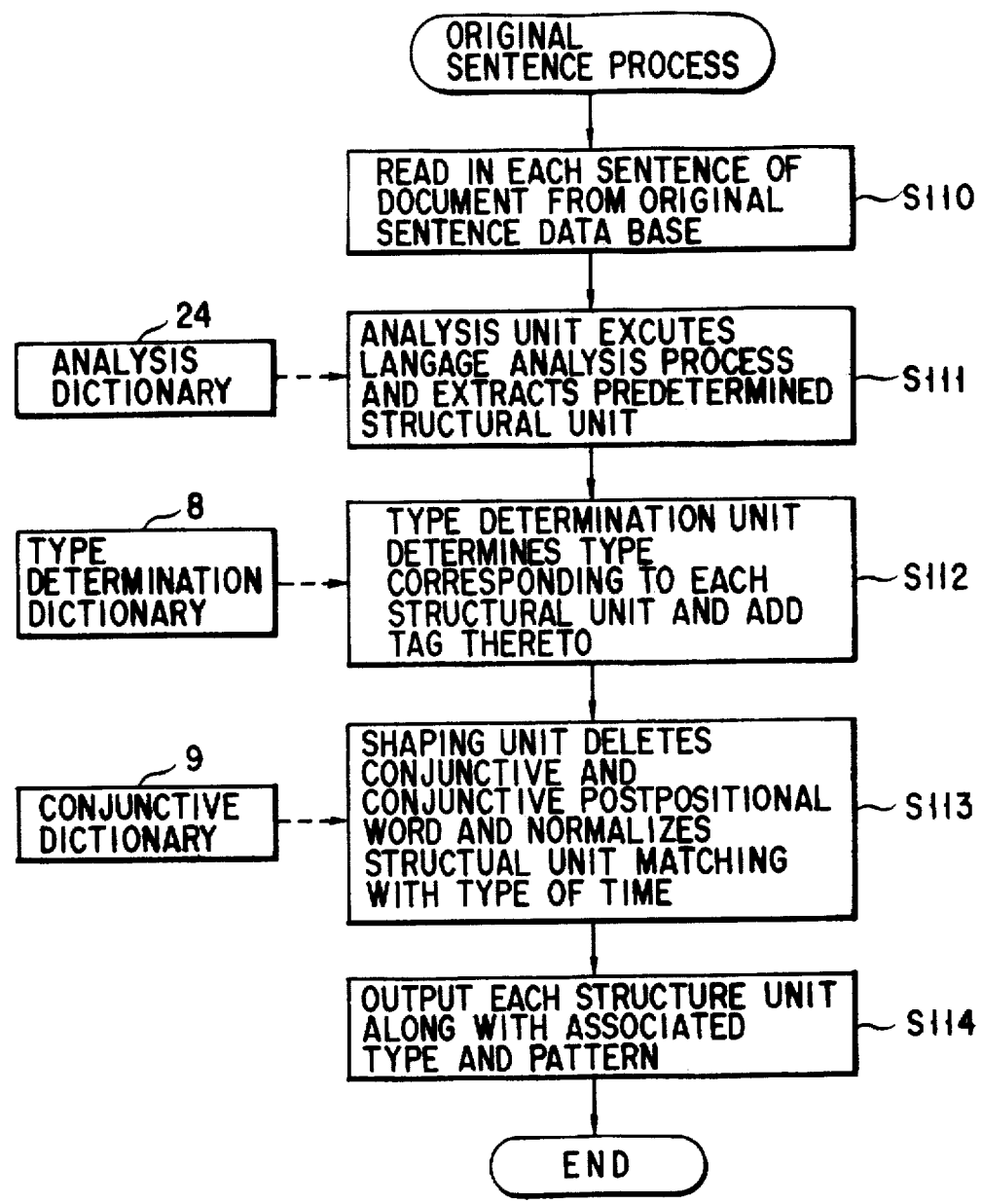
F I G. 31

FIG. 32A

TYPE OF EXCERPT INFORMATION
- ☐ when
- ☐ where
- ☑ who
- ☐ what
- ☐ how
- ⋮

EXCERPT INFORMATION
- PRIME MINISTER ○○
- EX-PRIME MINISTER △△
- DIRECTOR-GENERAL OF SCIENCE AND TECHNOLOGY AGENCY □□

FIG. 32B

ORIGINAL SENTENCES

In the last night press interview in the official Residence of prime minister, prime Minister ○○ ____, while ew-Prime minister △△ said ____ . It is expected that ____ from september 1996. Regarding this, Director-General of Science and Technology Agency ____ in domestic nuclear power plant ⋯
⋮

FIG. 32C

TYPE OF EXCERPT INFORMATION
- ☐ when
- ☑ where
- ☐ who
- ☐ what
- ☐ how
- ⋮

EXCERPT INFORMATION
- OFFICIAL RESIDENCE OF PRIME MINISTER
- DOMESTIC NUCLEAR POWER PLANT
- ××CITY, ○○PREFECTURE

FIG. 32D

| <TYPE> | <PATTERN> |
|---|---|
| when : | "Date⋯" |
| | "Heisei⋯" |
| | "Today⋯" |
| where: | "In⋯" |
| | "Place of Meeting⋯" |
| who : | "(Subject)⋯" |
| ⋮ | |

DOCUMENT RETRIEVAL SYSTEM

Background of the Invention

1. Field of the Invention

The present invention relates, in particular, to a document retrieval system for retrieving document information in units of a document, the system being provided with a function of retrieving an excerpt sentence or excerpt information obtained by processing an original sentence of a document.

2. Description of the Related Art

In a conventional full-text-search-type document retrieval system, when a necessary document or information is retrieved from a document database, all characters or words of the document are to be searched. Thus, as compared to a keyword search type system, there is no need to designate keywords, nor does the user need to be familiar with the keywords.

However, in the full-text-search-type system, the number of documents and the amount of data, which meet the request for retrieving input words, sentences, etc., are very great. In this system, all sentences of each document meeting the retrieval request in the retrieval process are displayed on a display screen as they are. The user confirms all sentences of each document retrieved on the display screen, and retrieves the necessary document or information (consisting of a passage or words).

Accordingly, the user needs to look through original sentences of a great deal of retrieved documents. As a result, a great deal of time and labor are needed to obtain the necessary document or information. In order to overcome this problem, it is desirable to use a system wherein only a sentence or information is extracted from the original sentences of a retrieved document and displayed on a display screen in such a fashion as to permit easy visual understanding.

Recently, a technique for automatically preparing an excerpt or an abstract of a document has been developed, and a system for extracting only an important sentence from a retrieved document based on "conjunctive," for example, and displaying it by making use of this technique has been realized. Besides, a system for extracting from a document a passage or paragraph corresponding to, for example, a conclusion and displaying it has been developed.

In the above system, the importance of a sentence or information in a document varies, depending on the user's personal point of view, and a sentence or information desired by the user is not necessarily extracted. For example, even if a passage or paragraph corresponding to a conclusion of a document is extracted, a desired sentence or information is not necessarily contained in the extracted passage or paragraph. Furthermore, in a system displaying only an important sentence as an excerpt, the relationship between sentences, which are determined by "conjunctive," etc., is broken, resulting in display of a sentence which can be easily misunderstood, etc.

As has been described above, in the conventional document retrieval system, a necessary document or information is extracted from a great number of searched results, and thus a great deal of time and labor are necessary for the user. Besides, a system has been developed for displaying an excerpt of a retrieved document by making use of the technique of preparing an excerpt or an abstract of a document or extracting a designated passage or paragraph. However, the displayed excerpt portion is not necessarily desired by the user, and in some cases an excerpt sentence or information desired by the user cannot be obtained.

SUMMARY OF THE INVENTION

A first object of the invention is to extract and display only a desired excerpt sentence or information from all sentences of a retrieved document, thereby reducing the load of document retrieval work on the user.

A second object of the invention is to extract and display an excerpt sentence or information from a document on the basis of various points of view, thereby carrying out a retrieval process in accordance with various purposes.

A third object of the invention is to perform a retrieval process, wherein, when an excerpt sentence or information is extracted from all sentences of a retrieved document and displayed, on the basis of a predetermined standard, the number of excerpt sentences or information to be displayed can be controlled according to priority.

In order to achieve the above objects, a document retrieval system according to the present invention is provided with means which sets a plurality of sentence types for identifying the contents of sentences, such as "OPINION" and "PROPOSAL," prepares sentence-unit excerpt sentence data classified according to the sentence types from an original sentence database storing original sentence data constituting documents, and stores the excerpt sentence data as excerpt sentence database. The present system includes shaping means for shaping the excerpt sentence data in such a predetermined format that a conjunctive, for example, is deleted, extraction means for extracting excerpt sentence data corresponding to a designated sentence type, and display means for displaying all extracted excerpt sentence data in a table format.

In the present invention, when the user has selected a desired one of a plurality of predetermined sentence types, the extraction means extracts from the excerpt sentence database excerpt sentence data corresponding to the sentence type. For example, when the sentence type "OPINION" or "PROPOSAL" has been selected, all excerpt sentence data classified in the selected type is extracted from a retrieved document. The display means displays all the extracted excerpt sentence data in a table format. Thus, the user can obtain necessary sentences or information only by confirming on the display screen only the excerpt sentence data falling within the type "OPINION" or "PROPOSAL." In addition, the user can acquire, only by changing the sentence type, the excerpt sentence data of the changed type on the display screen. Accordingly, only by designating the sentence type, the user can easily retrieve necessary sentences, information and a document containing them.

BRIEF DESCRIPTION OF THE DRAWINGS

FIG. 1 is a block diagram showing a main part of a document retrieval system according to embodiments of the present invention;

FIGS. 6A and 6B are conceptual views for describing the operation of the first embodiment;

FIG. 7 is a flow chart for describing an operation relating to an excerpt process of the first embodiment;

FIG. 9 is a flow chart for describing an operation relating to a selection display process of the first embodiment;

FIG. 10 is a view for describing the operation relating to the selection display process of the first embodiment;

FIGS. 14A through 14C are views for describing the operation relating to the number control in the first embodiment;

FIGS. 17A and 17B are views for describing the operation relating to the updating process of the first embodiment;

FIGS. 19A through 19C are illustrations describing the operation relating to the degree-of-priority correcting process of the first embodiment;

FIG. 20 is a flow chart for describing an operation relating to a plural-document retrieval process of the first embodiment;

FIGS. 21A through 21C are views for describing the operation relating to the plural-document retrieval process of the first embodiment;

FIG. 23 is a flow chart for describing the operation of the second embodiment;

FIG. 25 is a functional block diagram according to a third embodiment;

FIG. 26 is a flow chart for describing the operation of the third embodiment;

FIG. 31 is a flow chart for describing the operation of the fourth embodiment;

FIGS. 32A through 32D are views for describing the operation of the fourth embodiment.

DETAILED DESCRIPTION OF THE PREFERRED EMBODIMENTS

Figure 2:
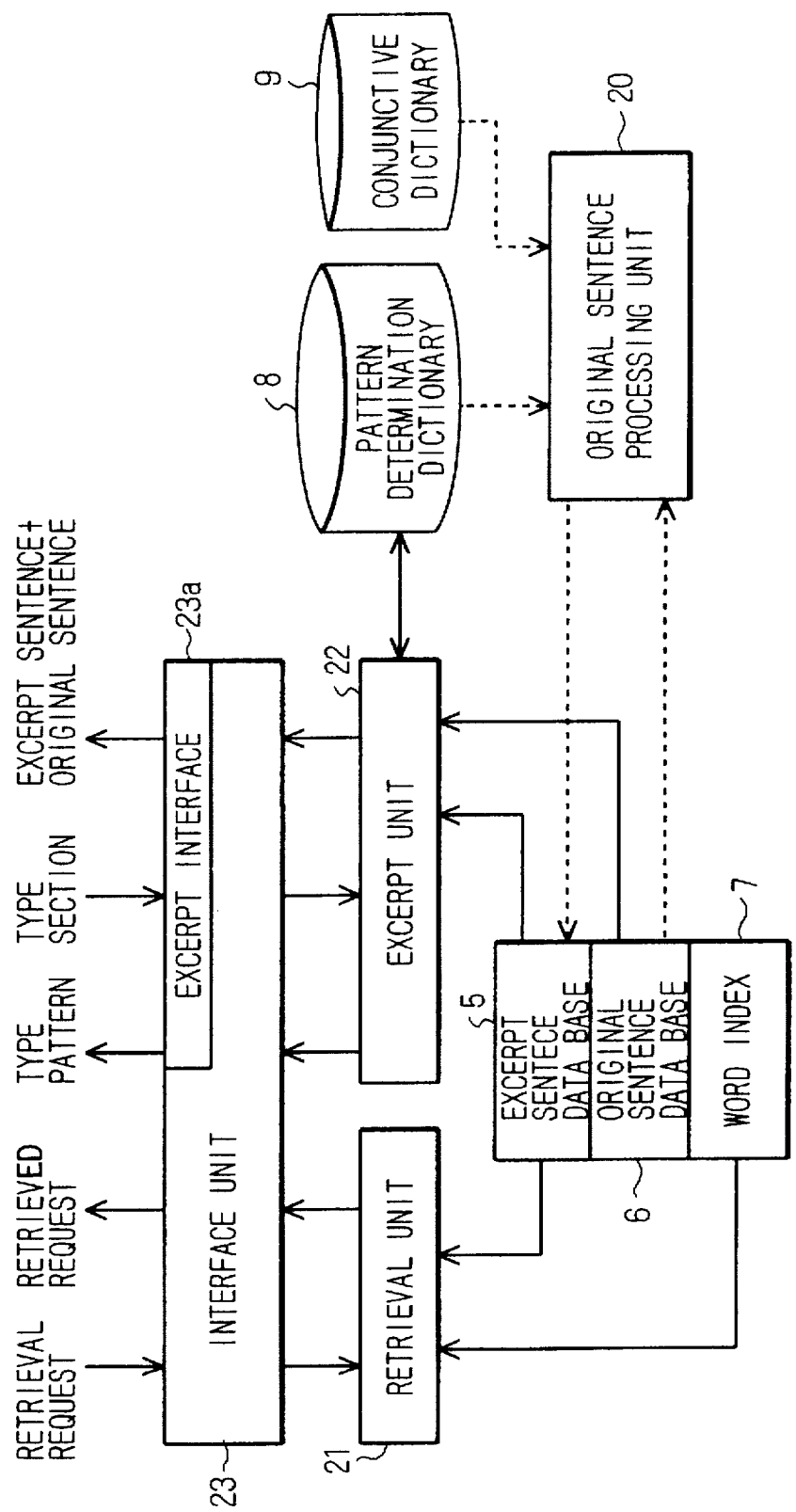
FIG. 2 is a functional block diagram according to a first embodiment.

Embodiments of the present invention will now be described with reference to the accompanying drawings.
(System Configuration)

FIG. 1 is a block diagram showing a main part of a document retrieval system according to the embodiments of the invention.

The present system generally comprises a central processing unit (CPU) 1 for performing various processing operations relating to a document retrieve process of the present embodiment and controlling the entire system, a display controller 2, a display unit 3, a storage unit 4, an input controller 10, and an input unit 11.

The display unit 3 comprises, for example, a liquid crystal display. The display unit 3 includes a display screen for displaying a retrieved result, a document, etc., under the control of the display controller 2. The input unit 11 includes a keyboard 11a and a mouse 11b for inputting a retrieve command and effecting various selecting operations, designating operations, etc., under the control of the input controller 10.

The storage unit 4 comprises a main memory (RAM) for effecting various processing operations of the CPU 1, and a file apparatus such as a hard disk drive. The storage unit 4 stores an excerpt sentence database 5, an original sentence database 6, a word index 7, a type determination dictionary 8, and a conjunctive dictionary 9.

(First Embodiment)

FIG. 2 is a functional block diagram showing a first embodiment of the above system. In FIG. 2, an original sentence processing unit 20, a retrieval unit 21, an excerpt unit 22, an interface unit 23 and an excerpt interface unit 23a are associated with programs executed by the CPU 1.

The interface unit 23 receives a retrieval request from the user in the format of a keyword or a sentence or a passage of natural language and delivers the retrieval request to the retrieval unit 21. The retrieval unit 21 refers to the original sentence database 6 and word index 7 and delivers a list of the relevant documents and the contents thereof to the interface unit 23 as a retrieval result. The retrieval result is supplied from the interface unit 23 to the display unit 3 and shown to the user on the display screen of the display unit 3.

The excerpt interface unit 23a built in the interface unit 23 functions to extract from all sentences of each document shown as a retrieval result a sentence alone which corresponds to the type of sentence designated by the user and to display the extracted sentence on the display screen.

If the type of sentence is selected by the user, the excerpt interface 23a delivers the selected type to the excerpt unit 22. The excerpt unit 22 refers to the original sentence database 6 and excerpt sentence database 5, extracts only a sentence of the selected type from all sentences and deletes the conjunctive from the extracted sentence. Then, the excerpt unit 22 delivers the extracted sentence to the excerpt interface 23a. The excerpt interface 23a displays the extracted sentence in comparison with the original sentence.

Figure 3:
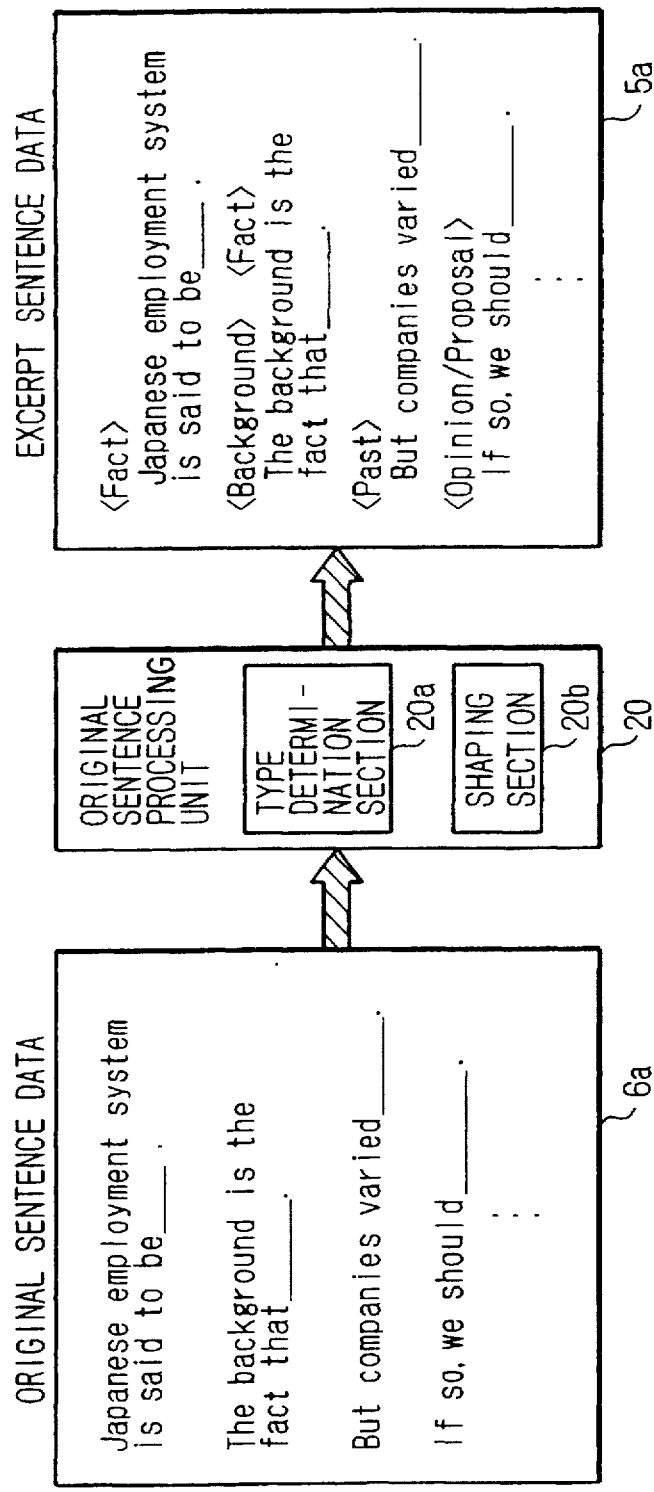
FIG. 3 is a conceptual view for describing the operation of the first embodiment.

The original sentence processing unit 20 generally comprises a type determination section 20a and a shaping section 20b, as shown in FIG. 3. The original sentence processing unit 20 prepares the excerpt sentence database 5 from the original sentence database 6.

The type determination section 20a refers to the type determination dictionary 8 and determines which type is associated with each sentence of the supplied document. In other words, the type determination section 20a performs a determination process for classifying each sentence of the document according to predetermined types. On the other hand, the shaping section 20b refers to the conjunctive dictionary 9 and shapes each sentence of the supplied document in a predetermined pattern, e.g., in a format in which a conjunctive is deleted in the present embodiment.

The original sentence processing unit 20 may prepare the excerpt sentence database 5 in a real-time processing manner each time the user selects the type, or may prepare the excerpt sentence database 5 in a batch process manner before the system is used (i.e., prior to the retrieval processing). In the present embodiment, it is supposed that the latter type, which permits high-speed processing, is adopted.

In FIG. 2, broken-line arrows indicate the flow of data prior to the use of the system, and solid-line arrows indicate the flow of data during the use of the system.

(Original Sentence Processing)

Figure 4:
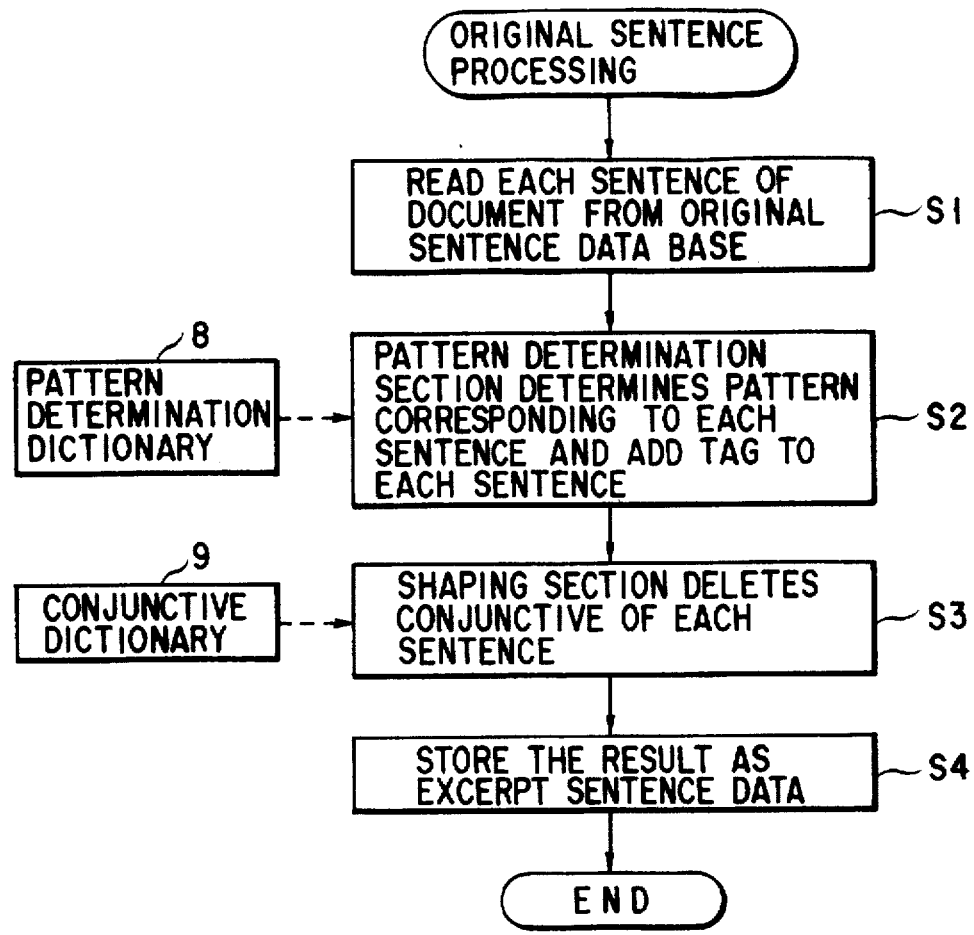
FIG. 4 is a flow chart for describing the operation of the first embodiment.

The specific operation of the above-mentioned original sentence processing unit 20 will now be described with reference to FIGS. 3 to 5.

The original sentence processing unit 20 reads in each sentence (original data) constituting a document from the original sentence database 6 in units of a document (step S1). As is shown in FIG. 3, the original sentence data is a sentence such as "Japanese employment system is said to be__," "The background is the fact that,__"etc."

Figures 5A, 5B:
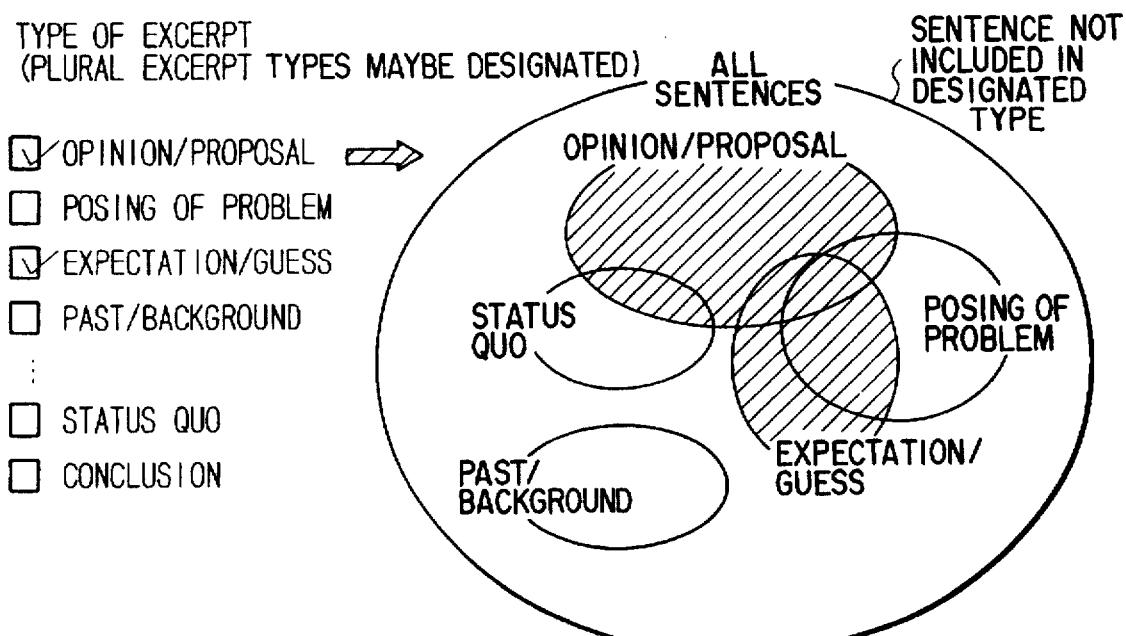
FIGS. 5A and 5B are conceptual views for describing the operation of the first embodiment.

Then, the type determination section 20a refers to the type determination dictionary 8, determines the type associated with each sentence, and adds a tag indicating the type (step S2). For example, as shown in FIG. 5A, the type determination dictionary 8 comprises items each consisting of a predetermined sentence type and a plurality of patterns associated with the sentence type. Each pattern is composed of, for example, a clause exactly expressing the associated sentence type.

FIG. 5A shows specific examples. Examples of the sentence type are "OPINION/PROPOSAL", "POSING OF PROBLEM", "EXPECTATION/GUESS", etc. Examples of the pattern associated with the type of "OPINION/PROPOSAL", are "It is considered that...", "Should it not be that...", etc. In the examples, the pattern "It is considered that. . ." is assigned to both the type "OPINION/PROPOSAL", and the type "EXPECTATION/GUESS." In other words, a sentence including this pattern can be expressed as both a sentences of the type "OPINION/PROPOSAL", and the type "EXPECTATION/GUESS." Since there is a sentence with a plurality of types, the respective types are not mutually exclusive.

The kind of the types prepared in the type determination dictionary 8 may be set, for example, according to the kind of documents to be handled. For example, in a process of retrieving an article from a newspaper, the types may be "FACT", "OBSERVATION", etc. In a process of retrieving a technical paper, the types of METHOD", "CONCLUSION," etc., are prepared.

The shaping section 20b refers to the conjunctive dictionary 9 and shapes each sentence in a predetermined format, e.g., in a format in which a conjunctive is deleted in this embodiment (step S3). For example, as shown in FIG. 3, the conjunctive "But" is deleted from the sentence "But companies varied. . . ."

The original sentence processing unit 20 stores the processed excerpt sentence data in the excerpt sentence database 5 (step S4). Specifically, as shown in FIG. 3, the original sentence processing unit 20 classifies the original sentence data 6 according to the determined type and prepares the excerpt sentence data 5a from which the conjunctive is deleted. For example, the original sentence "But companies varied. . ." is provided with a tag of the type "PAST" which matches with the pattern ". . .__(ie)(e)d", and converted to an excerpt sentence in which the conjunctive "But" is deleted.

In the present embodiment, the user can designate which type of sentence should be extracted from retrieved documents and displayed. In this case, only sentences of the type "OPINION/PROPOSAL", may be extracted from all sentences and displayed, or only sentences of the type "CONCLUSION" may be extracted and displayed. In this manner, the type can be switched. Besides, as shown in FIG. 5B, for example, types of "OPINION/PROPOSAL", and "EXPECTATION/GUESS", can be simultaneously selected. As mentioned above, since there is a sentence relating to a plurality of types among all sentences of a document, sentences in a hatched region are extracted, as shown in the Venn diagram in FIG. 5B. Of course, there is a sentence among all sentences, which accords with none of the set types.

(Excerpt Process)

A process of displaying excerpts by means of the excerpt interface 23a will now be described with reference to FIGS. 6A, 6B and 7.

As is shown in FIG. 6A, the user chooses, by operating the mouse 11b of the input unit 11, a desired type from a menu screen for selecting a type of excerpt sentence displayed on the display screen of the display unit 3. The excerpt interface 23a reads out excerpt sentence data corresponding to a document from the excerpt sentence database 5 via the excerpt unit 22 (step S10).

The excerpt interface 23a extracts, from the excerpt sentence data, all excerpt sentences provided with a tag of the type selected by the user (step S11). The sentence numbers of the extracted excerpt sentences are stored (step S12). All extracted excerpt sentences are displayed on the excerpt screen on the display screen, for example, in an itemized format (step S13).

For example, when the type "OPINION/PROPOSAL" has been selected, as shown in FIG. 6A, excerpt sentences (b, e, h, i) according to the type are displayed.

The excerpt interface 23a displays both the excerpt screen and original sentence screen in parallel on the display screen. The excerpt interface 23a reads out original sentence data of the relevant document from the original sentence database 6 via the excerpt unit 22 (step S14). In addition, the read-out original sentence data is displayed on the original sentence screen. At this time, the excerpt interface 23a displays the original sentences (b, e, h, i) corresponding to the sentence numbers of the stored excerpt sentences by highlighting them using different colors or underlines etc. (step S15).

Specifically, on the original sentence screen, the original sentence of sentence No. 2, which accord with is of the type "OPINION/PROPOSAL", and in which the conjunctive "But" has been deleted, is being highlighted. The excerpt sentence i is displayed on the excerpt sentence screen, which is a sentence according with the type "OPINION/PROPOSAL", but cannot be contained in the original sentence screen.

In FIG. 6B, the user switches the type to "EXPECTATION/GUESS", with respect to the same document. Since the original sentences of sentence Nos. 4 and 5 on the original sentence screen correspond to the type "EXPECTATION/GUESS", these sentences are extracted. In this case, the excerpt sentence data e corresponding to sentence No. 5 is associated with types "OPINION/PROPOSAL" and "EXPECTATION/GUESS."

(Pattern Display Process)

When the user selects the type of excerpt sentence, as mentioned above, it is desirable that the meanings of the types displayed as choices be easily understandable to the user. Desired information is easily obtained if the user knows that, for example, when the type "OPINION/

PROPOSAL" is selected, sentences of patterns such as "It is considered that...." and "Should it not be that...?" are to be extracted.

Figure 8A:
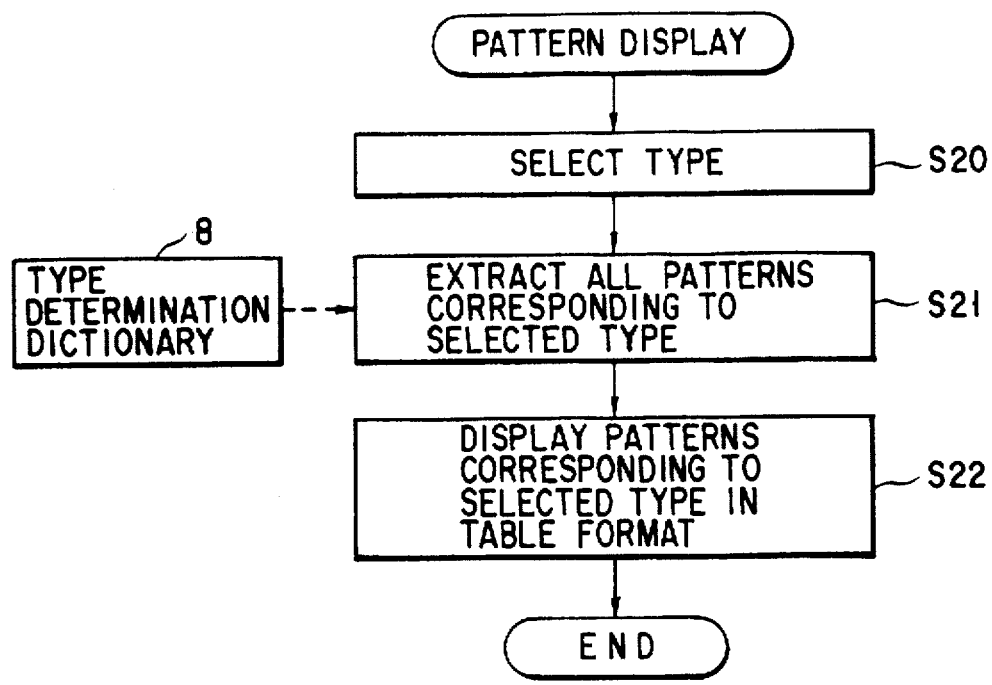
FIGS. 8A and 8B are views for describing an operation relating to a pattern process of the first embodiment.
Figure 8B:
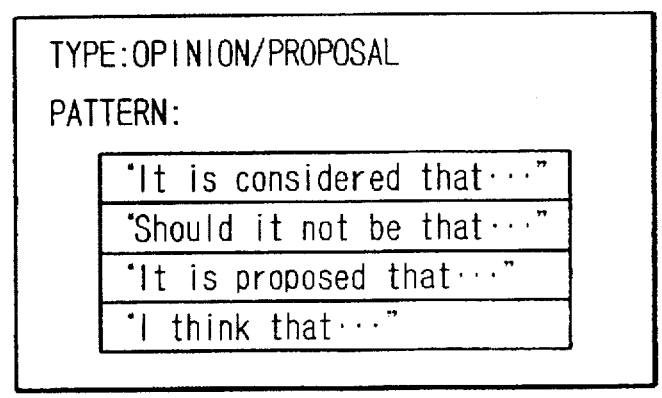

If the user selects a type, as shown in FIG. 8A, the excerpt unit 22 extracts all patterns corresponding to the selected type from the type determination dictionary 8 and outputs the patterns to the excerpt interface 23a (steps S20 and S21). The excerpt interface 23a displays patterns corresponding to, e.g., the selected type "OPINION/PROPOSAL" in a table format (step S22).

By the above function, the user can know in advance which sentence including a specific expression can be extracted if a certain type is selected.

(Selection Display Process)

In the above description, all sentences with the tag of the selected type in the excerpt sentence data are displayed as excerpt sentences. In a modification described below, sentences with the tag of the selected type are extracted, one or more of the extracted sentences are chosen on the basis of a certain standard, and the chosen one or ones are displayed.

As is illustrated in FIG. 9, the process to the step of extracting all excerpt sentences with the tag of the selected type is the same as the above-described one (steps S30 and S31).

Then, it is assumed that a sentence including as many as possible retrieval keywords specified in the retrieval request is an important sentence. Based on this standard, relevant excerpt sentences are displayed on the excerpt screen in an itemized format (steps S32 and S33).

In a specific example shown in FIG. 10, two sentences Nos. 2 and 4 are extracted from six sentences as excerpt sentences relevant to, e.g., the selected type "PURPOSE/AIM" of the two sentences, sentence No. 2 includes two retrieval keywords "DISTRIBUTED" and "ARCHITECTURE", whereas sentence No. 4 includes none of them. Thus, sentence No. 2 is regarded as more important than sentence No. 4, and the sentence No. 2 alone is displayed as an excerpt sentence.

Accordingly, it is highly possible that the user can refer to the most proper excerpt sentence matching with the selected type and including the retrieval keywords specified in the retrieval request.

(Specific Sentence Display Process)

In the above description, the user has only the right of selecting the type. When a certain type is selected, sentences matching with all patterns corresponding to the selected type are extracted. In a modification described below, the user can designate the extraction of only sentences matching with a specific pattern.

Figure 11:
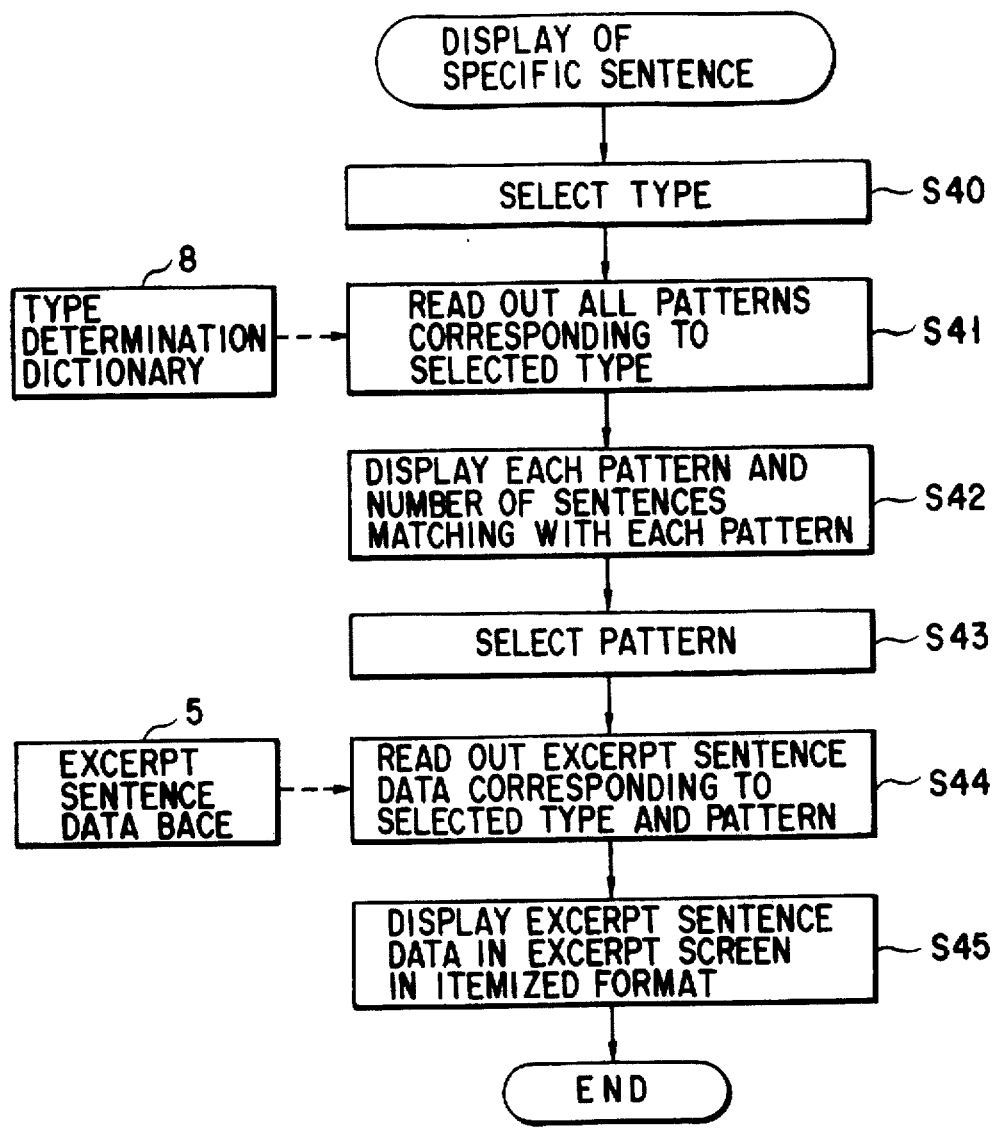
FIG. 11 is a flow chart for describing an operation relating to a specific sentence display process of the first embodiment.

As is illustrated in FIG. 11, the process to the step of reading out patterns corresponding to the selected type from the type determination dictionary 8 is the same as in the above-described pattern display process (steps S40 and S41).

Figures 12A, 12B:
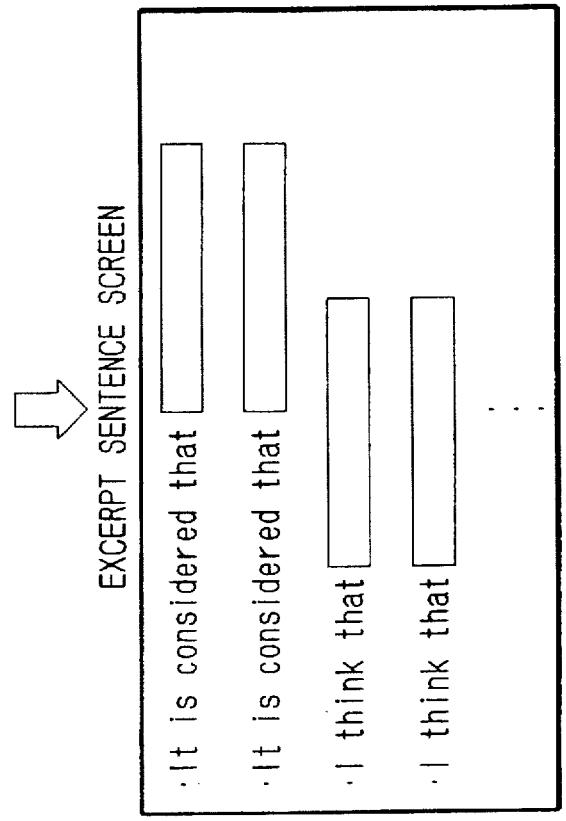
FIGS. 12A and 12B are views for describing an operation relating to number control in the first embodiment.

In this modification, as shown in FIG. 12A, patterns corresponding to, e.g., the type of "OPINION/PROPOSAL" are extracted. At this time, the number of sentences matching with each pattern is displayed on the excerpt sentence screen along each pattern (step S42). In this example, the number of sentences matching with the pattern "It is considered that . . . " is five and the number of sentences matching with the pattern "I think that. . ." is three. Accordingly, if the two patterns are selected, it is understood in advance that eight sentences are displayed on the excerpt sentence screen. Similarly, if the information on the length or the number of lines of a sentence matching with each pattern is displayed, the extracted sentence of the amount contained within the screen can be displayed to the user.

If the user selects, for example, the patterns "It is considered that . . . " and "I think that . . . " from the displayed patterns, the excerpt unit 22 extracts the relevant excerpt data from the excerpt database 5 and delivers the extracted data to the excerpt interface 23a (step S44).

As shown in FIG. 12A, the excerpt interface 23a displays on the excerpt sentence screen only the excerpt sentences corresponding to the type selected by the user and matching with the selected specific pattern (step S45). In this case, it is possible to perform a process of displaying only the important sentence chosen from the excerpt sentences matching the aforementioned pattern.

If the user is enabled to select the pattern as well as the type, as described above, the user can control the number of the excerpt sentences to a certain degree.

(Control of Number of Excerpt Sentences)

In a modification of the above technique, a priority order is preset to patterns prepared in the type determination dictionary 8, and the number of sentences displayed according to the priority order of patterns is controlled.

In this modification, as shown in FIG. 14A, the type determination dictionary 8 comprises items of the type and pattern, as well as information representative of the priority order among patterns. For example, the pattern "It is considered that. . . " has the highest priority order among patterns corresponding to the type "OPINION/PROPOSAL."

Suppose that information on the number of sentences, as shown in FIG. 14B, is obtained if the number of sentences matching with each pattern of the type "OPINION/PROPOSAL" is counted. Specifically, if the sentences alone of the patterns "It is considered that. . . " and "Should it not be that. . . ?" are displayed, three sentences are displayed in total. If the sentences of the pattern "It is proposed that. . . " with a higher priority order are added, six sentences are displayed in total.

Figure 13:
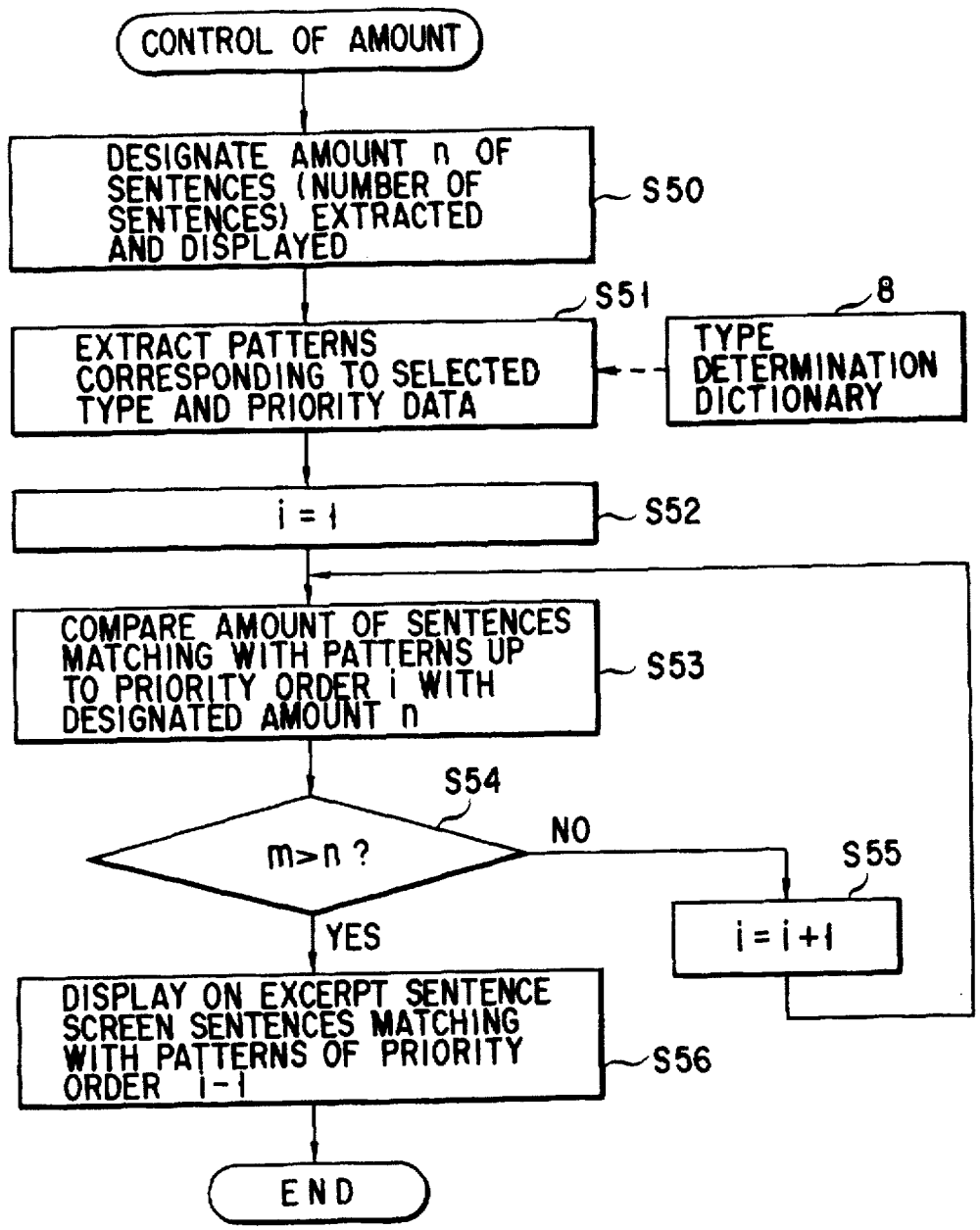
FIG. 13 is a flow chart for describing the operation relating to the number control in the first embodiment.
Figure 15:
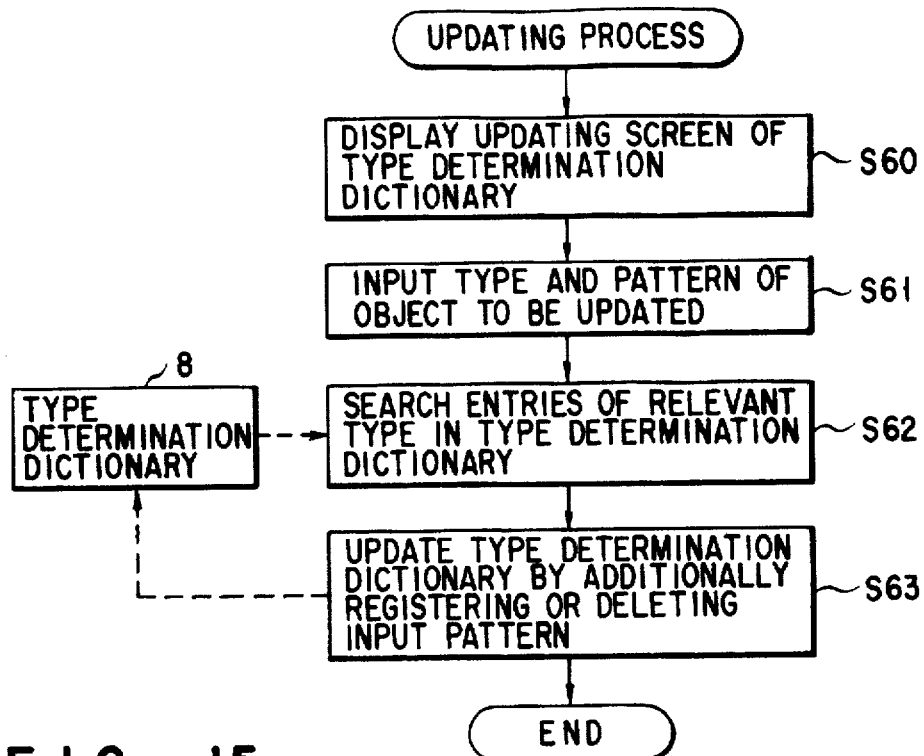
FIG. 15 is a flow chart for describing an operation relating to an updating process of the first embodiment.
Figure 18:
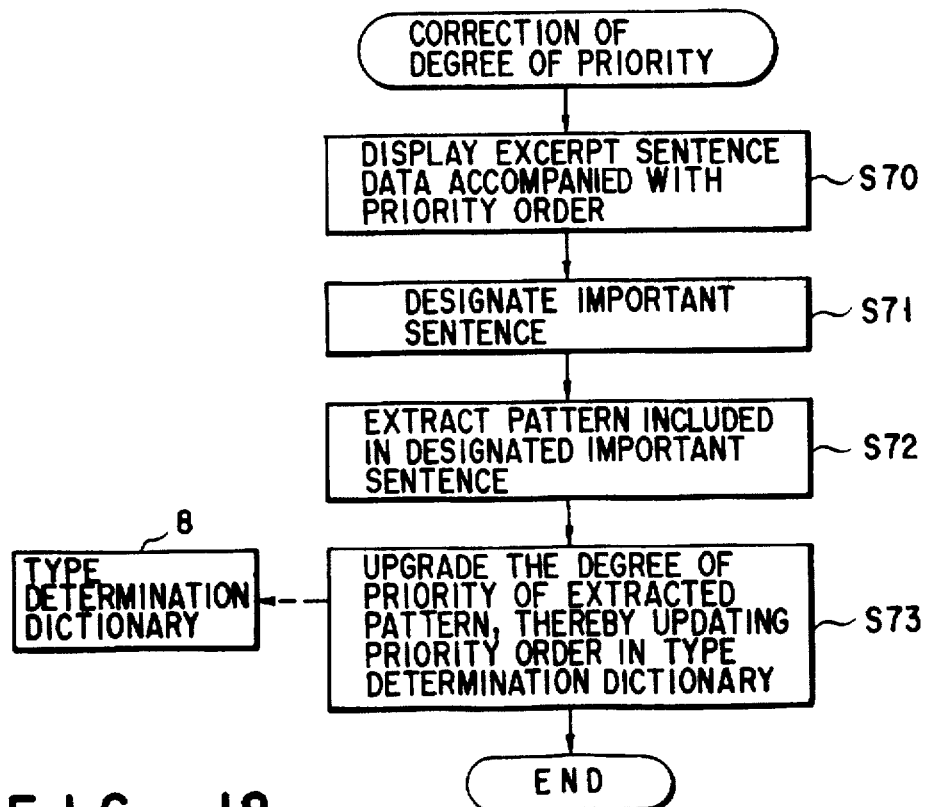
FIG. 18 is a flow chart for describing an operation relating to a degree-of-priority correcting process of the first embodiment.

In this modification, as illustrated in FIG. 13, the user designates on the display screen the number n of sentences (number of displayed sentences) to be extracted and displayed (step S50). In this case, as shown in FIG. 14C, suppose that the user restricts the number n of displayed sentences to five.

The excerpt unit 22 refers to the type determination dictionary 8 in which the priority order is described and compares the number n designated by the user and the number m of sentences matching the patterns up to the priority order i (steps S51 and S52). The excerpt sentences matching the patterns of the higher priority order are gradually selected within the range of designated number n (steps S54 an S55). Finally, the excerpt sentences falling within the range of the designated number n and matching the patterns of the higher priority order are output to the excerpt interface 23a.

As illustrated in FIG. 14C, the excerpt interface 23a displays on the excerpt screen the excerpt sentences (three sentences in this case) within the range of the number of displayed sentences (five sentences) designated by the user (step S56). In the present case, only the excerpt sentences matching with each of the patterns "It is considered. . . " and "Should it not be that" of the first and second priority orders are displayed.

In this example, the number of sentences is referred to. However, the display control may be performed on the basis of the length of sentences, the number of lines, etc. Instead of enabling the user to designate the number of sentences, it is possible to enable the user to designate the priority order of patterns, the sentences matching with which are to be displayed.

(Updating Process of Type Determination Dictionary)

In the above description, the type determination dictionary 8 is supposed to be a fixed one prepared in advance. In this modification, a new pattern may be added to the type determination dictionary 8 or an unsuitable pattern may be deleted.

At first, in accordance with the user's input, an updating screen for the type determination dictionary 8 is displayed (step S60). Then, a type and a pattern to be updated are input (step S61). In a specific example, as shown in FIG. 17A, the user designates on the original sentence screen a desired range ("should" in this case) of registration of patterns by means of a mouse 11b. Then, as shown in FIG. 17B, the type of the object for registration is designated. In the present case, a pattern ". . . should. . . " is added to the type "OPINION/PROPOSAL."

In accordance with these inputs, the excerpt unit 22 searches the entries relating to the relevant type in the type determination dictionary 8 (step S62). The input added pattern is registered in the type determination dictionary 8 as an entry of the relevant type and the dictionary 8 is updated (step S63).

Figure 16A:
FIGS. 16A and 16B are views for describing the operation relating to the updating process of the first embodiment.
Figure 16B:

In a specific example, as shown in FIG. 16B, an expression ". . .should. . . " is added as one of patterns of the type "OPINION/PROPOSAL."

Not only the addition of a pattern but also the deletion of a designated pattern may be effected in an updating process. In a specific example, as shown in FIG. 16A, suppose that the user considers, as unsuitable, the entry "Should it not be that. . . " corresponding to the type "OPINION/ PROPOSAL." In this case, the delete mode is selected in the updating process, and the pattern "Should it not be that . . . " is deleted.

By virtue of the above function, if the user finds a defect in the preset type determination dictionary 8 and a necessary pattern is not registered in patterns of prepared types, the pattern can be registered. In an inverse case, if there is an unsuitable pattern as an expression of a type, the pattern can be deleted.

Each entry in the type determination dictionary has a simple structure consisting of a pair of type and pattern. Thus, it is easy for the user to add or delete the entry. Therefore, the type determination dictionary 8 useful for the user can be reconstructed.

(Process of Correcting Degree of Priority)

With regards to the aforementioned number control process, the system for setting the priority order among the patterns in the type determination dictionary 8 has been described (see FIGS. 13 and 14A through 14C). A system for correcting the priority order so as to be convenient for the user will now be described.

As is shown in FIG. 19B, excerpt data corresponding to the selected type is displayed on the excerpt screen (step S70). In the type determination dictionary 8 for selection of excerpt sentence data, patterns are provided with information indicating the priority order, as shown in FIG. 19A.

Then, the user designates an important excerpt sentence on the excerpt screen by means of the mouse 11b (step S71). In a specific example, as shown in FIG. 19B, sentences of pattern "It is considered that. . . " and a sentence of pattern "Should it not be that. . . ?" are displayed. Now suppose that the user reviews the contents of the sentences and judges that the sentence of "Should it not be that. . . ?") is most important and designates it by means of the mouse 11b.

The excerpt unit 22 extracts a pattern of the relevant type from the designated excerpt sentence data and performs a process of raising the rank of the pattern in the priority order in the type determination dictionary 8 (steps S72 and S73).

In the specific example shown in FIG. 19A, in the originally prepared type determination dictionary 8, the pattern "It is considered that. . . " has the first priority as pattern of type "OPINION/PROPOSAL" and the pattern "Should it not be that . . . ?" has the second priority. In this case, the user designates the correction of the degree of priority of the pattern "Should it not be that. . . " Thus, the contents of the type determination dictionary 8 are updated so that the priority order is reversed between them.

By using the updated type determination dictionary 8 in the excerpt process accompanied with the number control process, excerpt sentences desired by the user are extracted and displayed.

(Display Process for Plural Documents)

The above description has been directed mainly to the process at the time one document was selected from the retrieval result. In a modification described below, a plurality of documents are extracted from the retrieval result on the basis of the same type or pattern.

In general, the retrieval result is presented successively from a document close to the retrieval result. However, there is a method in which the result is presented successively from a document containing as many as possible excerpt sentences corresponding to the selected type or pattern. In this case, it is understood that less excerpt information is contained in a document presented later. It is possible, therefore, to efficiently obtain information from a plurality of documents.

As is illustrated in FIG. 20, when the type and pattern have been selected according to the input by the user, a plurality of retrieved documents (A, B and C in this case) are sorted (steps S80 to S82). Each document is displayed in a sorted order (step S83).

As is shown in FIG. 21A, the excerpt sentence data of each of retrieved documents A, B and C contains information representing how many sentences are associated with each type and pattern. For example, the excerpt sentence data of document A contains ten sentences of the type "OPINION/PROPOSAL," no sentence of the type "POSING OF PROBLEM", and four sentences of the type "EXPECTATION/GUESS."

When the type selected by the user is "OPINION/ PROPOSAL," the number of sentences of the selected type is greater in the order of A, B and C. Thus, as shown in FIG. 21B, a document list is prepared in this order. If the type selected by the user is "EXPECTATION/GUESS," the number of sentences of the selected type is greater in the order of B, C and A. Thus, as shown in FIG. 21C, the document list is prepared in this order.

(Second Embodiment)

Figure 22:
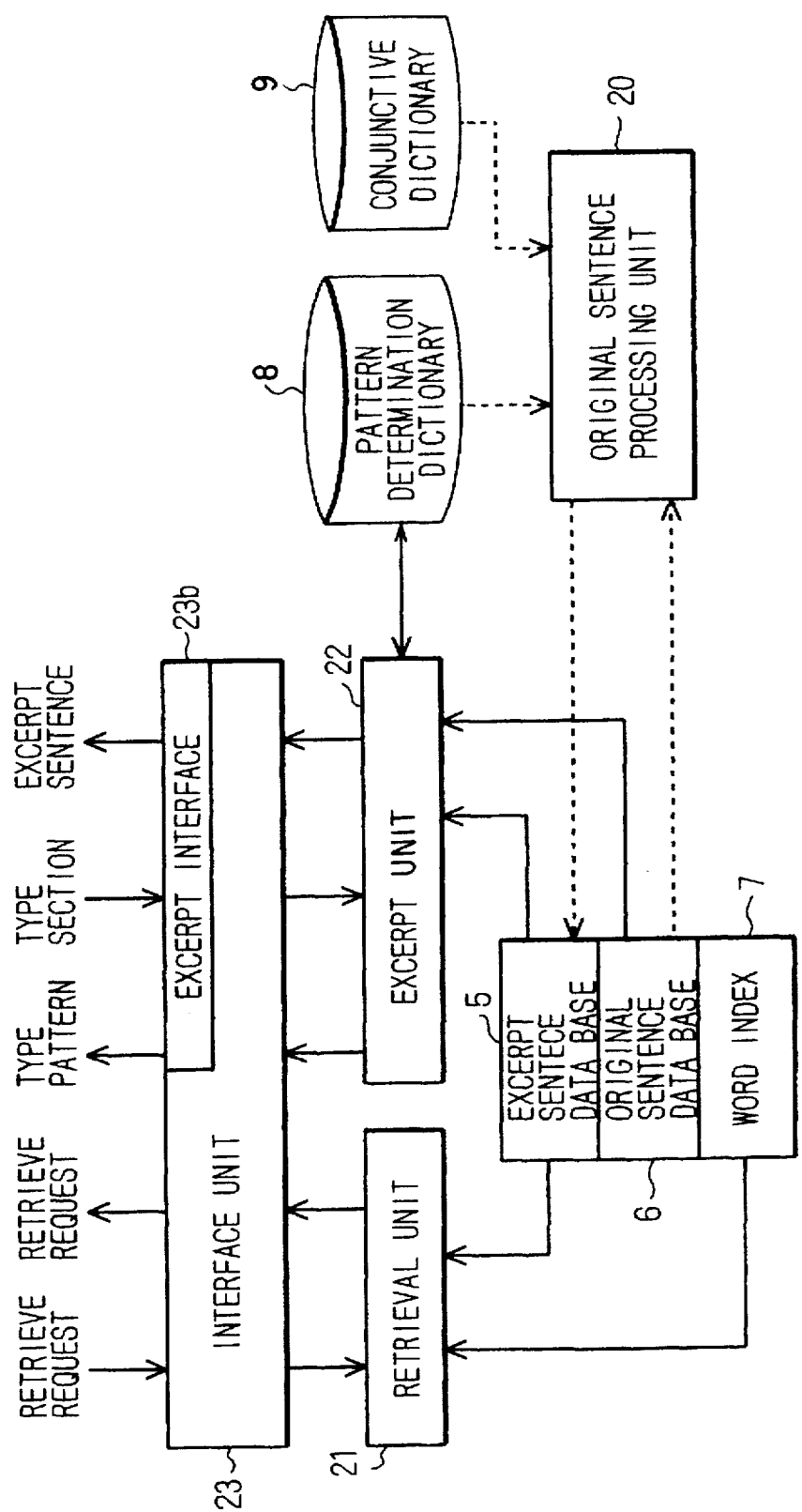
FIG. 22 is a functional block diagram according to a second embodiment.

A second embodiment of the present invention will now be described with reference to a functional block diagram of FIG. 22. This embodiment differs from the first embodiment in that an excerpt interface 23a has no exclusive-use screen for displaying original sentences. The difference between the first and second embodiments will be described. Accordingly, the functions of the common parts are the same as in the first embodiment.

(Process of Selecting All Sentences)

Figures 24, 28:
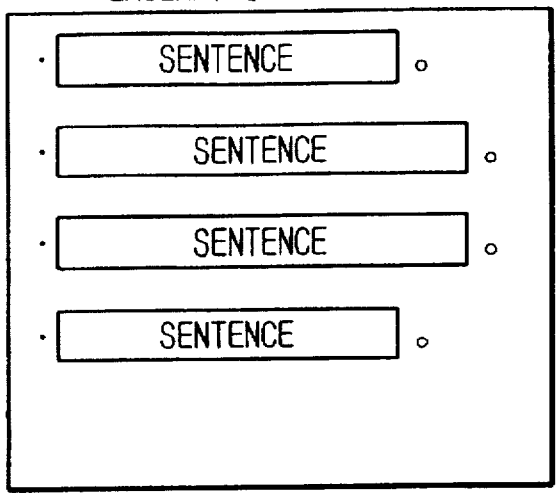
FIG. 24 is a view for describing the operation of the second embodiment.
FIG. 28 is a view for describing the structure of a type determination dictionary in the third embodiment.

In this embodiment, as shown in FIG. 24, an item "ALL SENTENCES" is included among the preset types of excerpt sentences. If this item is selected, all non-processed sentences are directly displayed on the excerpt screen.

Specifically, as shown in the flow chart of FIG. 23, the excerpt unit 22 extracts all sentences of original data from the original sentence database 5 and outputs them to the excerpt interface 23b (steps S90, S91 and S95). The excerpt interface 23b displays the original data on the excerpt screen as excerpt sentence data (step S96).

On the other hand, when a type other than "ALL SENTENCES" is selected, all excerpt sentences with the tag of the selected type are extracted from the excerpt sentence database 5 and displayed on the excerpt screen in the itemized format, as in the first embodiment ("NO" in step S91, and steps S92 and S94). For example, if the type of "OPINION/PROPOSAL" is selected, the excerpt sentences corresponding to the selected type are displayed on the excerpt screen, as shown in FIG. 24.

According to the present embodiment, the original sentence screen is not prepared, and only the type "ALL SENTENCES" is prepared. Thereby, the original sentence data can be directly referred to on the excerpt screen. Accordingly, the user can easily select and refer to the excerpt sentence data or original sentence data on an as-needed basis.

(Third Embodiment)

A third embodiment of the present invention will now be described with reference to the functional block diagram of FIG. 25. Unlike the second embodiment, the present embodiment is characterized in that language information obtained by a language analysis process is employed as a pattern for determining the type of sentence.

Specifically, in the first and second embodiments, the pattern for determining the type of sentence is a surface character string such as "It is considered that. . ." In other words, the excerpt sentence including the surface character string such as "It is considered that. . ." is determined to correspond to, e.g. the type "OPINION/PROPOSAL."

By contrast, in the present embodiment, high-level language information such as morphological information ("part of speech", "conjugation", etc.) and syntactic information ("subject", "predicate", "modification", etc.) obtained by language analysis of original sentences is made use of, thereby carrying out a pattern matching process and displaying optimal excerpt sentences.

A difference alone between the third embodiment and the first and second embodiments will be described. Accordingly, the functions of the common parts are the same as in the first and second embodiments.

Original Sentence Process)

As is illustrated in the flow chart of FIG. 26, the original sentence process unit 20 reads in each sentence (original sentence data) of a document from the original sentence database 6 (step S100). The original sentence data is, for example, "Japanese employment system is __." and "Possibly, the background may be that. . . . ," as shown in FIG. 27.

Figure 27:
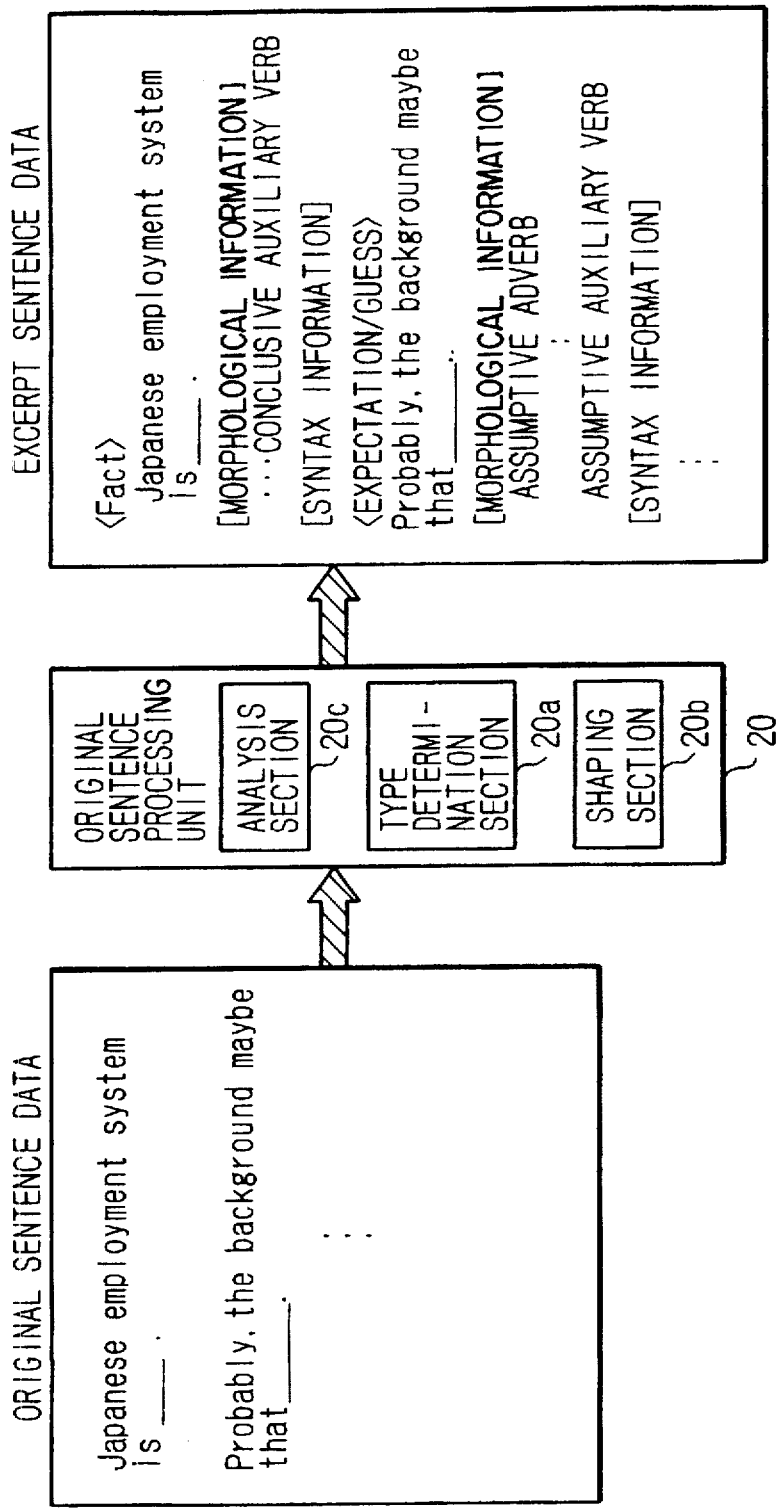
FIG. 27 is a view for describing the operation of the third embodiment.

As is shown in FIG. 27, an analysis section 20c of the original sentence process unit 20 refers to an analysis dictionary 24 prepared in advance and executes a language analysis process, thus extracting language information such as morphological information and syntactic information (step S101).

A type determination section 20a refers to the type determination dictionary 8, determines the type of each sentence, and adds the tag of the type (step S102). After the shaping process in which the conjunctive dictionary 9 is referred to, the excerpt sentence data is stored in the excerpt sentence database (steps S103 and S104). At this time, the excerpt sentence data is provided with language information such as morphological information and syntactic information as well as the tag of the type.

For example, as shown in FIG. 27, the excerpt sentence data "Japanese employment system is __." is accompanied with the tag of type "FACT" and language information "CONCLUSIVE AUXILIARY VERB" as morphological information.

When a pattern matching process corresponding to the type selected by the user is performed by making use of such language information, the above-mentioned language information is prepared in the type determination dictionary 8 as pattern corresponding to each type.

Specifically, as shown in FIG. 28, information relating to, e.g., the kind of "part of speech" is set as language information in place of the surface character storing listed as patterns. In addition, it is desirable to prepare patterns in which this language information and surface character string are combined.

(Fourth Embodiment)

Figure 29:
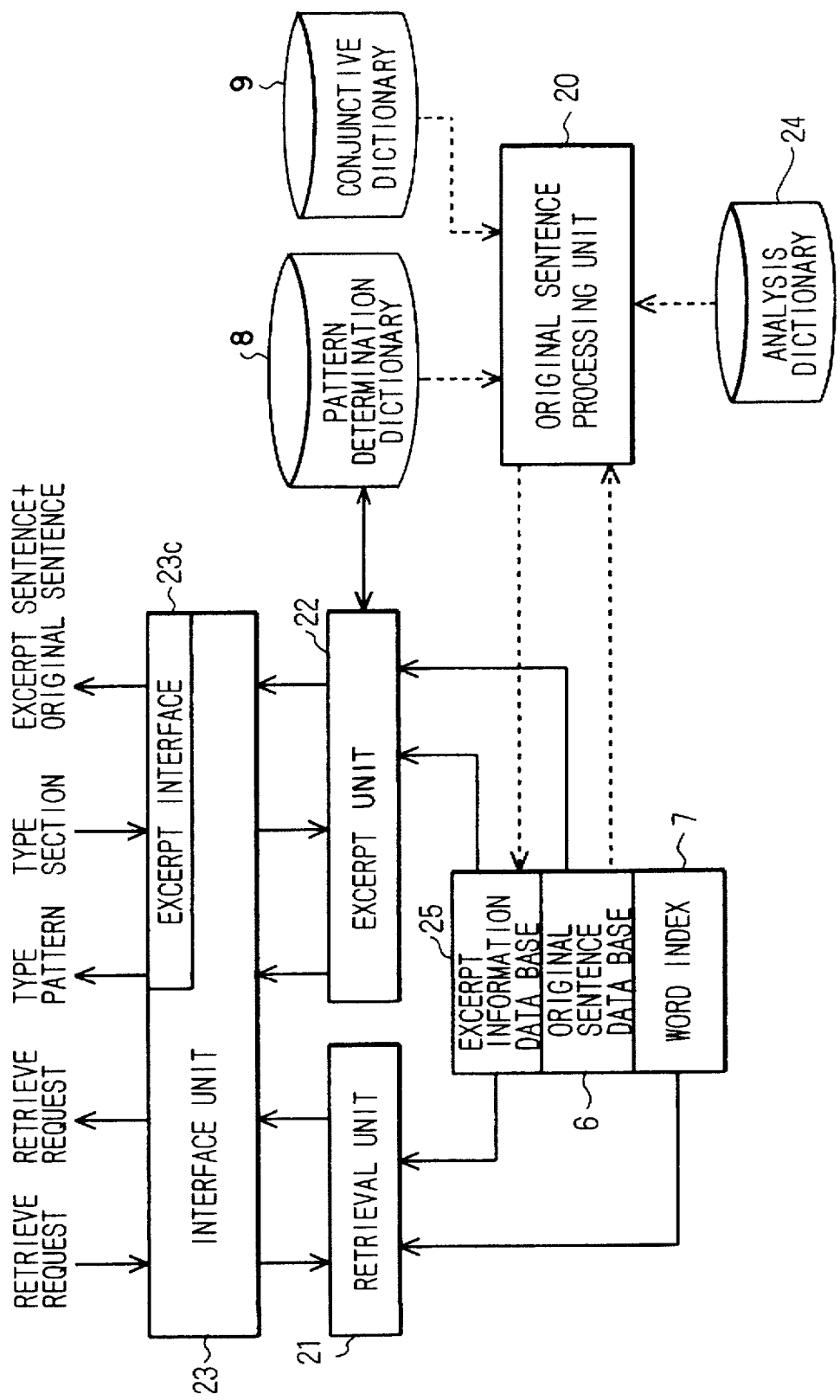
FIG. 29 is a functional block diagram according to a fourth embodiment.

A fourth embodiment of the present invention will now be described with reference to the functional block diagram of FIG. 29. The fourth embodiment differs from the first to third embodiments in that the type determination process and excerpt process are not performed in units of a sentence but in units of various structural elements of a sentence. Specifically, various structural elements of a sentence such as a phrase, a clause and an expression indicating a specific meaning are extracted and displayed.

In the present embodiment, the data obtained by the excerpt process are called excerpt information data, and the excerpt information data obtained by the process of the original sentence process unit 20 are stored in an excerpt information database 25.

(Original Sentence Process)

An original sentence process in the present embodiment will now be described with reference to FIGS. 31 and 32A through 32D.

At first, the original sentence process unit 20 reads in each sentence of a document from the original sentence database 6 (step S110). For example, as shown in FIG. 32B, the original sentence data is "In the last-night. . . in the Official Residence of Prime Minister, Prime Minister. . .".

The analysis section 20c of the original sentence process unit 20 refers to the analysis dictionary 24 prepared in advance and executes the ordinary language analysis process, thereby extracting a single sentence from a compound sentence or a complex sentence or extracting expressions of structural elements (structural units) of expressional modes, etc., such as a subject, a proper noun and time (step S111).

The type determination section 20a refers to the type determination dictionary 8, determines the type of each structural unit, and adds the tag of the type (step S112). The shaping section 20b at first deletes a conjunctive and a conjunctive postpositional word stated in the conjunctive dictionary 9 from the sentence or clause and then normalizes the structural unit of the sentence matching with the type "when" representing time (step S113). The original sentence process unit 20 outputs the structural units such as time and subject, along with the excerpt sentence accompanied with the type and language information (step S114)

Figure 30:
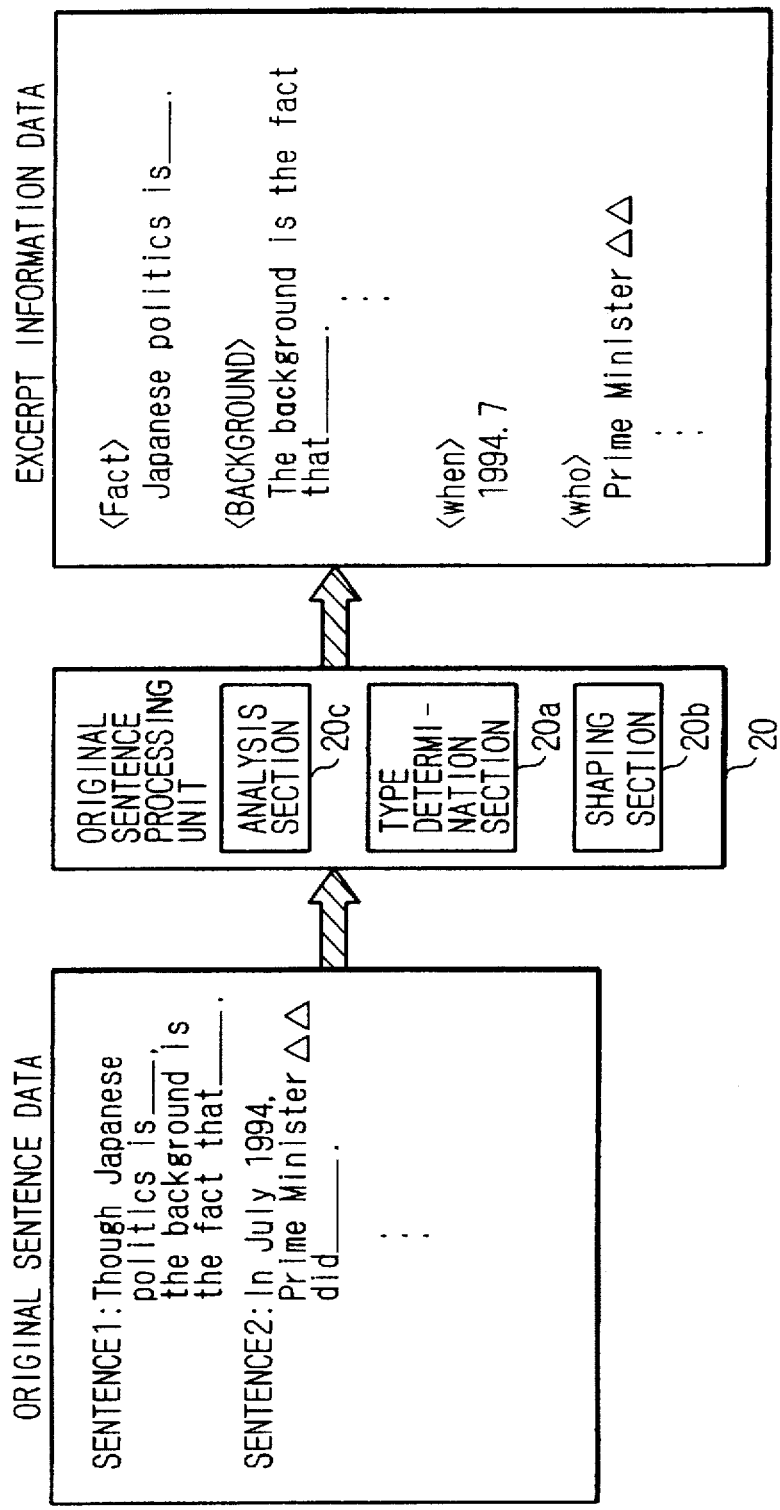
FIG. 30 is a view for describing the operation of the fourth embodiment.

In a specific example, excerpt information data as shown in FIG. 30 is prepared and stored in the excerpt information database 25. In this example, the first half of the sentence, "Though Japanese politics is. . . ." corresponds to the type "FACT", and the second half "the background is the fact that. . ."corresponds to the type "Background." In this manner, this embodiment is applicable to the case where two or more information items are included in one sentence. Although a conjunctive postpositional word and a punctuation mark appear at the end of the first clause "Though Japanese politics is...." the shaping section deletes these and makes the first clause end with an end-form word.

As is shown in FIG. 30, information "when" relating to time and information "who" relating to the subject of action is extracted from the second sentence. The expression "July 1994" in the original sentence is normalized to "1994.7" by the shaping section 20b.

In the present embodiment, as shown in FIG. 32D, the type determination dictionary 8 stores, for example, types of excerpt information such as "5W1H" and patterns associated therewith. In this case, as shown in FIG. 28, patterns may be described by using language information such as information on "part of speech."

Suppose that the user has selected, by making use of the type determination dictionary 8, the type "who" representing the subject of action, from among the types of excerpt information of "5W1H" prepared in advance, as shown in FIG. 32A. In this case, the name of a person or the subject of action, for example, "Prime Minister", "ex-Prime Minister" or "Director-General of Science and Technology Agency", is extracted from the original sentence and displayed on the excerpt information screen. Similarly, if the user has selected, for example, the type "where" representing "place", the words meaning a place such as "Official Residence of Prime Minister" or "Domestic Nuclear Power Station" are extracted from the same original sentence and displayed on the excerpt information screen.

As has been described above in detail, according to the present invention, in a document retrieval system for retrieving a full-text document, 1) only a desired excerpt sentence or information is extracted from all sentences of a retrieved document and displayed, thereby to reduce the load of a document retrieval work by the user, 2) an excerpt sentence or information is extracted from the same document on the basis of various standpoints or standards and displayed, thereby achieving a retrieval process meeting various purposes for retrieval, and 3) when only an excerpt sentence or information which meets a predetermined standard is extracted from all sentences of a retrieved document and displayed, it is possible to control the number of the excerpt sentences or information which is to be displayed according to a priority order.

In other words, only a sentence of a type desired by the user or structural elements of the sentence are displayed, thereby achieving efficient browsing of a great deal of retrieval results. In addition, excerpt information alone is displayed in a compact format, thereby achieving intuitional and general comprehension of the entire document and reducing the load of work for scrolling the screen. Furthermore, the type of excerpt information may be changed so that the user can extract important portions from various standpoints, since the degree of importance of extracted sentences in the original sentences vary depending on standpoints.

In the above embodiments, a retrieval system of documents stored in a database has been described. However, the present invention is not limited to the above embodiments. For example, the present invention can be applied to a retrieval system of documents sent through a communication network such as the INTERNET.

What is claimed is:

1. A document retrieval system for retrieving a document corresponding to a retrieval request, said system comprising:

original document database means for storing original data constituting a document to be retrieved;

excerpt sentence database means for storing, in units of sentences, excerpt sentence data classified into a plurality of types preset on the basis of the original document data;

selection means for selecting a desired one of said plurality of types;

extraction means for extracting, from said excerpt document database means, the excerpt sentence data corresponding to the type selected by said selection means; and means for outputting all excerpt sentence data extracted from said extraction means.

2. The system according to claim 1, further comprising selection/output means for outputting, from the excerpt sentences extracted by the extraction means, one or more of the extracted sentences based on a certain standard for outputting the selected one or ones.

3. The system according to claim 2, wherein the selection/output means selects and outputs the one or more of the extracted sentences based on the standard that a sentence including maximum retrieval keywords is the excerpt sentence to the selected.

4. The system according to claim 1, wherein the extraction means extracts sentences matching with all patterns corresponding to the selected type.

5. The system according to claim 4, wherein the extraction means includes means for selecting a specific pattern so that only sentences matching with a specific pattern can be extracted among all the patterns corresponding to the selected type.

6. The system according to claim 1, further comprising:

a type determination dictionary for determining the selected pattern;

means for presetting a priority order to patterns prepared in the type determination dictionary; and means for controlling the number of sentences displayed according to the priority order of patterns.

7. The system according to claim 6, further comprising means for adding new pattern to the type determination dictionary and for deleting unsuitable pattern from the dictionary.

8. The system according to claim 6, further comprising means for correcting the priority order of the patterns of the type determination dictionary so as to be convenient for a user.

9. The system according to claim 1, wherein the extraction means includes means for performing the excerption process over a plurality of documents resulted from the retrieval based on the same type or pattern.

10. A document retrieval system for retrieving a document corresponding to a retrieval request, said system comprising:

original document database means for storing original data constituting a document to be retrieved;

producing means for producing, in units of sentences, excerpt sentence data classified into a plurality of types preset on the basis of the original document data;

shaping means for shaping the excerpt sentence data produced by said producing means in a predetermined format;

excerpt sentence database means for storing the excerpt sentence data shaped by said shaping means;

selection means for selecting a desired one of said plurality of types;

extraction means for extracting, from said excerpt sentence database means, the excerpt sentence data corresponding to the type selected by said selection means; and means for outputting all excerpt sentence data extracted from said extraction means, and outputting in an emphasizing manner the original sentence data corresponding to said extracted excerpt sentence data.

11. A document retrieval system for retrieving a document corresponding to a retrieval request, said system comprising:

original document database means for storing original data constituting a document to be retrieved;

producing means for producing, in units of sentences, excerpt sentence data classified into a plurality of types preset on the basis of the original data;

shaping means for shaping the excerpt sentence data produced by said producing means in a predetermined format;

excerpt sentence database means for storing the excerpt sentence data shaped by said shaping means;

selection means for selecting a desired one of said plurality of types or an all-sentence output mode;

extraction means for extracting, from said excerpt sentence database means, the excerpt sentence data corresponding to the type selected by said selection means;

all-sentence output means for reading out the original sentence data corresponding to all sentences of the document to be retrieved from said original sentence database means and outputting the read-out data, when said all-sentence output mode has been selected by said selection means; and means for outputting all excerpt sentence data extracted from said extraction means or the original sentence data output from the all-sentence output means.

12. A document retrieval system for retrieving a document corresponding to a retrieval request, said system comprising:

original document database means for storing original data constituting a document to be retrieved;

producing means for producing, in units of sentences, sentence-unit excerpt sentence data classified into a plurality of sentence types preset on the basis of the original data;

shaping means for shaping the excerpt sentence data produced by said producing means in a predetermined format;

excerpt sentence database means for storing the excerpt sentence data shaped by said shaping means;

selection means for selecting a desired one of said plurality of sentence types;

extraction means for extracting, from said excerpt sentence database means, the excerpt sentence data corresponding to the type selected by said selection means; and means for outputting only specific excerpt sentence data extracted from said extraction means, which data includes a designated keyword, and outputting the specific excerpt sentence data.

13. A document retrieval system for retrieving a document corresponding to a retrieval request, said system comprising:

original document database means for storing original data constituting a document to be retrieved;

language information generating means for subjecting said original sentence data to a language analysis process in units of sentences and generating language information obtained by the language analysis process;

excerpt sentence database means for storing, in units of sentences, excerpt sentence data classified in accordance with a plurality of types preset on the basis of the original data, said excerpt sentence data being accompanied with said language information;

selection means for selecting a desired one of said plurality of types;

extraction means for extracting, from said excerpt sentence database means, the excerpt sentence data corresponding to the type selected by said selection means; and means for outputting all excerpt sentence data extracted from said extraction means along with said language information.

14. A document retrieval system for retrieving a document corresponding to a retrieval request, said system comprising:

original document database means for storing original data constituting a document to be retrieved;

language analysis processing means for subjecting said original sentence data to a language analysis process and extracting from said original sentence data predetermined structural elements of a sentence, which are based on language information obtained by the language analysis process;

excerpt information database means for storing excerpt sentence data classified in accordance with a plurality of information types preset for said predetermined structural elements extracted by said language analysis processing means;

selection means for selecting a desired one of said plurality of information types;

extraction means for extracting, from said excerpt information database means, the excerpt information data corresponding to the information type selected by said selection means; and means for outputting all excerpt information data extracted from said extraction means.

15. A document retrieval system for retrieving a document corresponding to a retrieval request, said system comprising:

means for receiving a document to be retrieved sent through a communication network;

original document database means for storing original data constituting a document to be retrieved sent through the communication network;

producing means for producing in units of sentences, excerpt sentence data classified into a plurality of types preset on the basis of the original document data;

shaping means for shaping the excerpt sentence data produced by said producing means in a predetermined format;

excerpt sentence database means for storing the excerpt sentence data shaped by said shaping means;

selection means for selecting a desired one of a plurality of types preset;

extraction means for extracting, from the excerpt sentence database means, the excerpt sentence data corresponding to the type selected by said selection means; and means for outputting all excerpt sentence data extracted from said extraction means.

* * * * *